US012712815B2

(12) United States Patent
Wu

(10) Patent No.: US 12,712,815 B2
(45) Date of Patent: Aug. 18, 2026

(54) CHANNEL SWITCHING METHOD, ELECTRONIC DEVICE AND STORAGE MEDIUM

(71) Applicant: Honor Device Co., Ltd., Shenzhen (CN)

(72) Inventor: Dongang Wu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 392 days.

(21) Appl. No.: 18/034,998

(22) PCT Filed: Apr. 13, 2022

(86) PCT No.: PCT/CN2022/086641
§ 371 (c)(1),
(2) Date: May 2, 2023

(87) PCT Pub. No.: WO2022/262399
PCT Pub. Date: Dec. 22, 2022

(65) Prior Publication Data

US 2024/0022518 A1 Jan. 18, 2024

(30) Foreign Application Priority Data

Jun. 16, 2021 (CN) ......................... 202110666547.5
Sep. 27, 2021 (CN) ......................... 202111135318.7

(51) Int. Cl.
*H04L 47/2475* (2022.01)
*H04W 28/02* (2009.01)

(52) U.S. Cl.
CPC ..... *H04L 47/2475* (2013.01); *H04W 28/0236* (2013.01)

(58) Field of Classification Search
None
See application file for complete search history.

(56) References Cited

U.S. PATENT DOCUMENTS 7,567,512 B1 * 7/2009 Minei ..................... H04L 45/00 370/468
8,547,846 B1 * 10/2013 Ma ...................... H04L 47/2433 370/413

(Continued)

FOREIGN PATENT DOCUMENTS

CN 106060884 A 10/2016
CN 108337706 A 7/2018

(Continued)

OTHER PUBLICATIONS

Jianfei, H. et al., "Analysis of the positioning and development strategy of WLAN network in LTE era", Electronics World Issue 22, Nov. 30, 2023, pp. 146-147.

(Continued)

*Primary Examiner* — Mariela Vidal Carpio
(74) *Attorney, Agent, or Firm* — Slater Matsil, LLP

(57) ABSTRACT

A channel switching method, an electronic device and a storage medium are provided. The electronic device includes a first network channel and a second network channel, and a use priority of the second network channel is higher than a use priority of the first network channel. The method includes: starting a first application, where the first application includes a first data flow, and the first data flow is carried on the first network channel; and when it is detected that the second network channel is enabled and it is detected that the first data flow is a data flow of a preset type, keeping the first data flow still carried on the first network channel.

20 Claims, 31 Drawing Sheets

(56) References Cited

U.S. PATENT DOCUMENTS

| | | | | |
|---|---|---|---|---|
| 9,622,161 | B1 * | 4/2017 | Law | H04L 69/325 |
| 10,735,469 | B1 * | 8/2020 | Dods | H04L 63/20 |
| 2013/0039237 | A1 * | 2/2013 | Kubota | H04W 72/02 370/329 |
| 2013/0039354 | A1 * | 2/2013 | Martin | H04W 72/04 370/338 |
| 2013/0258887 | A1 * | 10/2013 | De Pasquale | H04W 28/16 370/252 |
| 2014/0003358 | A1 * | 1/2014 | Elliott | H04W 52/0212 370/329 |
| 2016/0050605 | A1 | 2/2016 | Kim et al. | |
| 2016/0135222 | A1 * | 5/2016 | Jain | H04W 74/04 370/329 |
| 2017/0053258 | A1 * | 2/2017 | Carney | H04L 45/22 |
| 2017/0070919 | A1 * | 3/2017 | Verger | H04L 67/148 |
| 2018/0049109 | A1 * | 2/2018 | Sunay | H04W 28/0268 |
| 2020/0413296 | A1 * | 12/2020 | Chen | H04W 36/00 |
| 2021/0227376 | A1 * | 7/2021 | Jha | H04W 8/183 |
| 2022/0159777 | A1 * | 5/2022 | Lin | H04W 76/36 |

FOREIGN PATENT DOCUMENTS

| | | | |
|---|---|---|---|
| CN | 108449771 | A | 8/2018 |
| CN | 109316743 | A | 2/2019 |
| CN | 110049525 | A | 7/2019 |
| CN | 110312286 | A | 10/2019 |
| CN | 114172791 | A | 3/2022 |
| WO | 2015134624 | A1 | 9/2015 |

OTHER PUBLICATIONS

Telecom Italia; "Using IMS SC and multi access PDN connectivity for IP flow mobility"; 3GPP draft+Feb. 16-20, 2009; XP050333388; 2 pages.

Gidon Reid et al; "FMCA MIH Use Cases"; IEEE draft; Apr. 28, 2009; XP017659315; 9 pages.

3GPP TSG SA"Network based IP flow mobility(Release 13)",3GPP Standard;3GPP TR 23.861,vol. SA WG2,No. V13.0.0,Jun. 19, 2015.

* cited by examiner (ip. addr==10. 223.177.170 && udp. port==43712 && ip. addr==36. 152. 58. 35 && udp.port==10031) && (data[6]==65 ‖ data[6]==64)

| | delta tine | Source | Destination | Data Voice stream packet features | Protocol | dst. port | src. port |
|---|---|---|---|---|---|---|---|
| 119 | 0.803153 | 10.223.177.170 | 36.152.58.35 | 2828f7003208641001 18c280d2ca89f7a5f67520052alc6f736577523075507a45635149... | UDP | 10031 | 43712 |
| 128 | 0.848730 | 36.152.58.35 | 10.223.177.170 | 2828c7002e0865100018c280d2ca89f7a5f67520052alc6f736577523075507a45635149... | UDP | 43712 | 10031 |
| 273 | 1.808426 | 10.223.177.170 | 36.152.58.35 | 28289f003208641001 18c280d2ca89f7a5f67520052alc6f736577523075507a45635149... | UDP | 10031 | 43712 |
| 280 | 1.849414 | 36.152.58.35 | 10.223.177.170 | 2828c7002e0865100018c280d2ca89f7a5f67520052alc6f736577523075507a45635149... | UDP | 43712 | 10031 |
| 387 | 2.802202 | 10.223.177.170 | 36.152.58.35 | 282827003208641001 18c280d2ca89f7a5f67520052alc6f736577523075507a45635149... | UDP | 10031 | 43712 |
| 396 | 2.844236 | 36.152.58.35 | 10.223.177.170 | 2828c7002e0865100018c280d2ca89f7a5f67520052alc6f736577523075507a45635149... | UDP | 43712 | 10031 |
| 562 | 3.808591 | 10.223.177.170 | 36.152.58.35 | 28284e003208641001 18c280d2ca89f7a5f67520052alc6f736577523075507a45635149... | UDP | 10031 | 43712 |
| 573 | 3.850020 | 36.152.58.35 | 10.223.177.170 | 2828c7002e0865100018c280d2ca89f7a5f67520052alc6f736577523075507a45635149... | UDP | 43712 | 10031 |
| 737 | 4.808063 | 10.223.177.170 | 36.152.58.35 | 282826003208641001 18c280d2ca89f7a5f67520052alc6f736577523075507a45635149... | UDP | 10031 | 43712 |
| 744 | 4.848748 | 36.152.58.35 | 10.223.177.170 | 2828c7002e0865100018c280d2ca89f7a5f67520052alc6f736577523075507a45635149... | UDP | 43712 | 10031 |
| 915 | 5.814503 | 10.223.177.170 | 36.152.58.35 | 28289e003208641001 18c280d2ca89f7a5f67520052alc6f736577523075507a45635149... | UDP | 10031 | 43712 |
| 924 | 5.853845 | 36.152.58.35 | 10.223.177.170 | 2828c7002e0865100018c280d2ca89f7a5f67520052alc6f736577523075507a45635149... | UDP | 43712 | 10031 |
| 1085 | 6.803975 | 10.223.177.170 | 36.152.58.35 | 2828ff003208641001 18c280d2ca89f7a5f67520052alc6f736577523075507a45635149... | UDP | 10031 | 43712 |
| 1092 | 6.849197 | 36.152.58.35 | 10.223.177.170 | 2828c7002e0865100018c280d2ca89f7a5f67520052alc6f736577523075507a45635149... | UDP | 43712 | 10031 |

FIG. 8 ip. dst==192. 168. 43. 186 && udp. dstport==43496 && ip.src==101.226.129.122 && udp. srcport==11988 (data[0]==00) (data[1]==01)

| No. | Time | delta time | Protocol | Source | Destination | src. port | dst. port | Info | Le | Data |
|---|---|---|---|---|---|---|---|---|---|---|
| 5646 | 2021-04-30 09:32:07.024078 | 37.497885 | UDP | 101.226.129.122 | 192.168.43.186 | 11988 | 43496 | 11988 → 43496 Len=73 | … | 0001000001000000000000100336600 0b000b401301000000040 |
| 5663 | 2021-04-30 09:32:07.497369 | 37.971176 | UDP | 101.226.129.122 | 192.168.43.186 | 11988 | 43496 | 11988 → 43496 Len=73 | … | 00010000020000000000001003366000b000b401301000000060 |
| 5700 | 2021-04-30 09:32:08.370853 | 38.844660 | UDP | 101.226.129.122 | 192.168.43.186 | 11988 | 43496 | 11988 → 43496 Len=73 | … | 00010000030000000000001003366000b000b401301000000070 |
| 5718 | 2021-04-30 09:32:08.847579 | 39.321386 | UDP | 101.226.129.122 | 192.168.43.186 | 11988 | 43496 | 11988 → 43496 Len=73 | … | 00010000040000000000001003366000b000b401301000000080 |
| 5722 | 2021-04-30 09:32:09.383089 | 39.856896 | UDP | 101.226.129.122 | 192.168.43.186 | 11988 | 43496 | 11988 → 43496 Len=73 | … | 00010000050000000000001003366000b000b401301000000090 |
| 5725 | 2021-04-30 09:32:09.906050 | 40.379857 | UDP | 101.226.129.122 | 192.168.43.186 | 11988 | 43496 | 11988 → 43496 Len=73 | … | 00010000060000000000001003366000b000b4013010000000a0 |
| 5727 | 2021-04-30 09:32:10.415159 | 40.888966 | UDP | 101.226.129.122 | 192.168.43.186 | 11988 | 43496 | 11988 → 43496 Len=73 | … | 00010000070000000000001003366000b000b4013010000000b0 |
| 5740 | 2021-04-30 09:32:11.227562 | 41.701369 | UDP | 101.226.129.122 | 192.168.43.186 | 11988 | 43496 | 11988 → 43496 Len=73 | … | 00010000080000000000001003366000b000b4013010000000d0 |
| 5752 | 2021-04-30 09:32:11.456430 | 41.930237 | UDP | 101.226.129.122 | 192.168.43.186 | 11988 | 43496 | 11988 → 43496 Len=73 | … | 00010000090000000000001003366000b000b4013010000000f0 |
| 5768 | 2021-04-30 09:32:12.002613 | 42.476420 | UDP | 101.226.129.122 | 192.168.43.186 | 11988 | 43496 | 11988 → 43496 Len=73 | … | 000100000a0000000000001003366000b000b401301000000140 |
| 5791 | 2021-04-30 09:32:12.502225 | 42.976032 | UDP | 101.226.129.122 | 192.168.43.186 | 11988 | 43496 | 11988 → 43496 Len=73 | … | 000100000b0000000000001003366000b000b401301000000190 |
| 5814 | 2021-04-30 09:32:13.027414 | 43.501221 | UDP | 101.226.129.122 | 192.168.43.186 | 11988 | 43496 | 11988 → 43496 Len=73 | … | 000100000c0000000000001003366000b000b4013010000001c0 |
| 5830 | 2021-04-30 09:32:13.631323 | 44.105130 | UDP | 101.226.129.122 | 192.168.43.186 | 11988 | 43496 | 11988 → 43496 Len=73 | … | 000100000d0000000000001003366000b000b4013010000001f0 |
| 5848 | 2021-04-30 09:32:14.592458 | 45.066265 | UDP | 101.226.129.122 | 192.168.43.186 | 11988 | 43496 | 11988 → 43496 Len=73 | … | 000100000e0000000000001003366000b000b401301000000200 |
| 5857 | 2021-04-30 09:32:15.128571 | 45.602378 | UDP | 101.226.129.122 | 192.168.43.186 | 11988 | 43496 | 11988 → 43496 Len=73 | … | 000100000f0000000000001003366000b000b401301000000210 |
| 5869 | 2021-04-30 09:32:15.953207 | 46.427014 | UDP | 101.226.129.122 | 192.168.43.186 | 11988 | 43496 | 11988 → 43496 Len=73 | … | 00010000100000000000001003366000b000b401301000000220 |
| 5876 | 2021-04-30 09:32:16.653399 | 47.127206 | UDP | 101.226.129.122 | 192.168.43.186 | 11988 | 43496 | 11988 → 43496 Len=73 | … | 00010000110000000000001003366000b000b401301000000230 |
| 5898 | 2021-04-30 09:32:17.191883 | 47.665690 | UDP | 101.226.129.122 | 192.168.43.186 | 11988 | 43496 | 11988 → 43496 Len=73 | … | 00010000120000000000001003366000b000b401301000000240 |
| 5940 | 2021-04-30 09:32:17.713304 | 48.187111 | UDP | 101.226.129.122 | 192.168.43.186 | 11988 | 43496 | 11988 → 43496 Len=73 | … | 00010000130000000000001003366000b000b401301000000250 |
| 5983 | 2021-04-30 09:32:18.264306 | 48.738113 | UDP | 101.226.129.122 | 192.168.43.186 | 11988 | 43496 | 11988 → 43496 Len=73 | … | 00010000140000000000001003366000b000b401301000000260 |
| 6039 | 2021-04-30 09:32:18.767172 | 49.240979 | UDP | 101.226.129.122 | 192.168.43.186 | 11988 | 43496 | 11988 → 43496 Len=73 | … | 00010000150000000000001003366000b000b401301000000270 |
| 6111 | 2021-04-30 09:32:19.286859 | 49.760666 | UDP | 101.226.129.122 | 192.168.43.186 | 11988 | 43496 | 11988 → 43496 Len=73 | … | 00010000160000000000001003366000b000b401301000000280 |
| 6205 | 2021-04-30 09:32:19.828051 | 50.301858 | UDP | 101.226.129.122 | 192.168.43.186 | 11988 | 43496 | 11988 → 43496 Len=73 | … | 00010000170000000000001003366000b000b401301000000290 |

FIG. 10

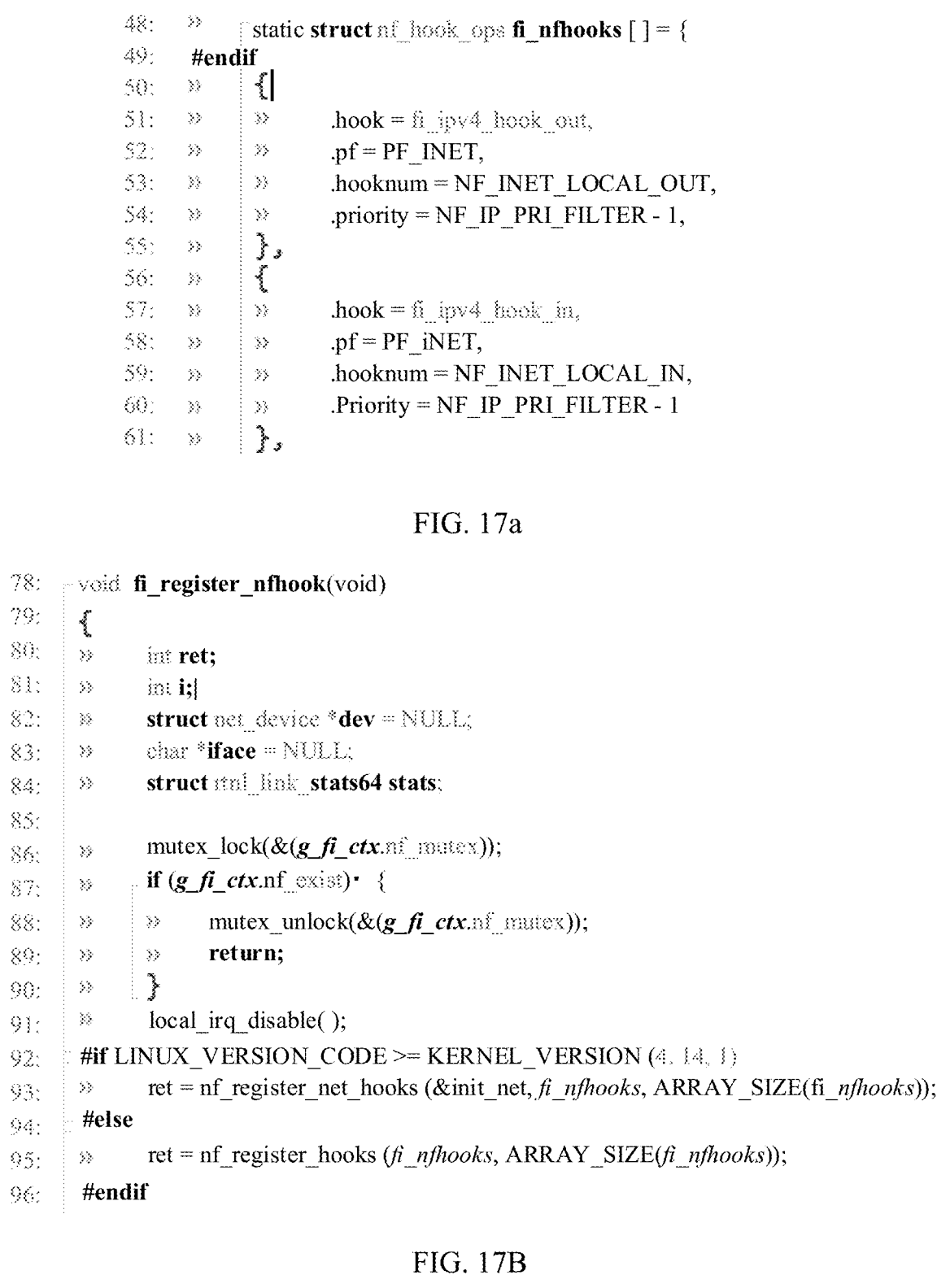

```
    static struct nf_hook_ops fi_nfhooks [ ] = {
#endif
    {
        .hook = fi_ipv4_hook_out,
        .pf = PF_INET,
        .hooknum = NF_INET_LOCAL_OUT,
        .priority = NF_IP_PRI_FILTER - 1,
    },
    {
        .hook = fi_ipv4_hook_in,
        .pf = PF_iNET,
        .hooknum = NF_INET_LOCAL_IN,
        .Priority = NF_IP_PRI_FILTER - 1
    },
```

FIG. 17a

```
void fi_register_nfhook(void)
{
    int ret;
    int i;
    struct net_device *dev = NULL;
    char *iface = NULL;
    struct rtnl_link_stats64 stats;

    mutex_lock(&(g_fi_ctx.nf_mutex));
    if (g_fi_ctx.nf_exist)  {
        mutex_unlock(&(g_fi_ctx.nf_mutex));
        return;
    }
    local_irq_disable( );
#if LINUX_VERSION_CODE >= KERNEL_VERSION (4, 14, 1)
    ret = nf_register_net_hooks (&init_net, fi_nfhooks, ARRAY_SIZE(fi_nfhooks));
#else
    ret = nf_register_hooks (fi_nfhooks, ARRAY_SIZE(fi_nfhooks));
#endif
```

FIG. 17B

```
<immediateReport>                                         <!--Internal fields and periodicRepor
    <upLink>
        <roi>1</roi>                                      <!--Enumerated value: OFF:0 ALWAYS:1 Nur
        <roiRange>1:1</roiRange>                          <!--Start count and end count, begin
        <filterPktSize>0:15000</filterPktSize>            <!--Optional, focusing only on a data packet of a specific length,
        <filterStr>64</filterStr>                         <!--Optional, content value of a string with a maximum of 15
        <filterStrOffset>6</filterStrOffset>              <!--Optional, a string of a data packet matches an offset,
        <target>0,1,2</target>                            <!--Feature type obtained by FI kernel, other values
        <targetStrOffset>0:150</targetStrOffset>          <!--Optional, when target is payloadStr
    </upLink>
    <downLink>
        <roi>1</roi>                                      <!--Enumerated value: OFF:0 ALWAYS:1 NU
        <roiRange>0:5</roiRange>                          <!--Start count and end count, Begin
        <filterPktSize>0:15000</filterPktSize>            <!--Optional, focusing only on a data packet of a specific length,
        <filterStr>65</filterStr>                         <!--Optional, content value of a string with a maximum of 15
        <filterStrOffset>6</filterStrOffset>              <!--Optional, a string of a data packet matches an offset,
        <target>0,1,2</target>                            <!--Feature type obtained by FI kernel, other values
        <targetStrOffset>0:150</targetStrOffset>          <!--Optional, when target is payloadStr
    </downLink>
</immediateReport>
```

FIG. 18

```
static bool fi_payload_str_filter_check(struct fi_pkt_parse *pktinfo, fi_rpt_cfg *rpt_cfg
{
»       int i;
»       _be16 payloadlen = pktinfo->payloadlen;
»       char *payload = pktinfo->payload;
»       uint32_t filter_str_ offset;
»       /* If no filter set, default return match */
»       if (!rpt_cfg->filter_str_len[0])
»       »    return true;

»       if (payload == NULL)
»       »  return false;

»       for (i= 0; i < FI_FLOW_FILTER_STR_MAX; i++) {
»       »    if (!rpt_cfg->filter_str_len[i])
»       »    »  break;
»       »    if (i < rpt_cfg->filter_str_offset_len)
»       »    » filter_str_offset = rpt_cfg->filter_str_offset[i];
»       »    else
»       »    » filter_str_offset = rpt_cfg->filter_str_offset[0];
»       »    if (filter_str_offset + rpt_cfg->filter_str_len[i] > payloadlen)
»       »    »  continue;
»       »    if (memcmp(rpt_cfg->filter_str[i],
»       »    »  »    payload + filter_str_offset,
»       »    »  »    rpt_cfg->filter_str_len[i]) == 0)
»       »    »  return true;
»       }
»       return false;
} « end fi_payload_str_filter_check
```

FIG. 19

```
<flowType>10</flowType>            <!--Enumerated value: DOWNLOAD: 1 UPLOAD: 2 VIDEO_STREAM: 3 AUDIO_STREA
<classification>                          <!--Matching policy, including a plurality of cas
  <featureCase>                           <!--In a featureCase
      <protocol>17</protocol>            <!--IPPROTO_TCP = 6 IPPROTO_
      <port>-1</port>                    <!--If there are a plurality of ports, they can be listed
      <stringFeature>                     <!--A string feature, based on target, Fl
         <source>2</source>        <!--Reporting source of statistical data, which is specified by the message type; other values:
         <target>10</target>            <!--Other values: dnsQuery:0, dnsAnsW
         <customStrLoc>0</customStrLoc>    <!--Used together with the target field, customS
         <cmpValue>00010000</cmpValue>     <!--Content value of a string with a maximum of 1
      </stringFeature>
  </featureCase>
```

FIG. 21

CHANNEL SWITCHING METHOD, ELECTRONIC DEVICE AND STORAGE MEDIUM

CROSS-REFERENCE TO RELATED APPLICATIONS

This application is a national stage of International Application No. PCT/CN2022/086641, filed on Apr. 13, 2022, which claims priority to Chinese Patent Application No. 202110666547.5, filed on Jun. 16, 2021, and Chinese Patent Application No. 202111135318.7, filed on Sep. 27, 2021. The disclosures of each of the aforementioned applications are hereby incorporated by reference in their entireties.

TECHNICAL FIELD

This application relates to the field of communication technologies, and in particular, to a channel switching method, an electronic device and a storage medium.

BACKGROUND

With the rapid development of electronic technologies and internet technologies, mobile devices such as mobile phones are more widely used in people's daily life. For example, mobile payment, gaming, and the like can be performed through mobile phones. To ensure normal running of common services (such as games, calls, and social software), usually a user's mobile phone is connected to a wireless network. However, when a network environment changes, a flow of an application is switched between different network channels. If a switching speed of the network channels is relatively slow, service running may be stuck during a switching process, which reduces user experience.

SUMMARY

This application provides a channel switching method, an electronic device and a storage medium, which can reduce a problem of stuck service running caused by network channel switching, thereby improving user experience.

According to a first aspect, an embodiment of this application provides a channel switching method, applied to an electronic device. The electronic device includes a first network channel and a second network channel, and a use priority of the second network channel is higher than a use priority of the first network channel. The method includes: starting a first application, where the first application includes a first data flow, and the first data flow is carried on the first network channel; and when it is detected that the second network channel is enabled and when it is detected that the first data flow is a data flow of a preset type, keeping the first data flow still carried on the first network channel. In this method, when it is detected that the second network channel is enabled and it is detected that the first data flow is a data flow of the preset type, the first data flow is kept still carried on the first network channel instead of switching the first data flow to the second network channel having a higher priority, to reduce network channel switching of the first data flow, thereby reducing a problem of stuck service running possibly caused by network channel switching of the first data flow, and improving user experience.

In a possible implementation, the method further includes: when it is detected that the second network channel is enabled and it is detected that the first data flow is not a data flow of the preset type, switching the network channel carrying the first data flow to the second network channel.

In a possible implementation, before the keeping the first data flow still carried on the first network channel, the method further includes: determining that network quality of the first network channel meets a transmission requirement of the first data flow. In this method, when it is determined that the network quality of the first network channel meets the transmission requirement of the first data flow, the first data flow is kept still carried on the first network channel instead of switching the first data flow to the second network channel having a higher priority, to reduce network channel switching of the first data flow while ensuring that serve running is not affected by no network channel switching of the first data flow, thereby reducing a problem of stuck service running possibly caused by network channel switching of the first data flow, and improving user experience.

In a possible implementation, the method further includes: determining that the network quality of the enabled first network channel does not meet the transmission requirement of the first data flow, and switching the network channel carrying the first data flow to the second network channel. In this method, it is determined that the network quality of the enabled first network channel does not meet the transmission requirement of the first data flow, the network channel carrying the first data flow is switched to the second network channel, to reduce a problem of stuck service running caused by a decrease in network channel quality of the first data flow, thereby improving user experience.

In a possible implementation, before the switching the network channel carrying the first data flow to the second network channel, the method further includes: determining that network quality of the enabled second network channel meets a transmission requirement of the first data flow. In this method, the first data flow is switched to the second network channel when it is determined that the network quality of the enabled second network channel meets the transmission requirement of the first data flow and the first data flow is not a data flow of the preset type, so as to perform network channel switching while ensuring the network quality after the first data flow is switched, thereby improving user experience.

In a possible implementation, the method further includes: determining that the network quality of the enabled second network channel does not meet the transmission requirement of the first data flow, and keeping the first data flow still carried on the first network channel. In this method, when it is determined that the network quality of the enabled second network channel does not meet the transmission requirement of the first data flow, the first data flow is kept still carried on the first network channel, to ensuring network quality of the first data flow that is not of the preset type, and prevent a decrease in network quality after the first data flow is switched to the second network channel, thereby improving user experience.

In a possible implementation, whether the first data flow is a data flow of the preset type is detected based on at least one of the following parameters: a protocol type, a port number, a packet transmission feature, and a specific string in a packet; and the packet transmission feature includes at least one of the following features: a packet size, a quantity of packets within preset duration, and a packet transmission speed.

In a possible implementation, the preset type is a delay-sensitive flow, and a data flow whose type is a delay-sensitive flow is delay-sensitive.

In a possible implementation, after the starting a first application, before it is detected that the first data flow is a data flow of the preset type or that the first data flow is not a data flow of the preset type, the method further includes: obtaining a packet of the first application from a packet carried on the first network channel; and obtaining a packet of the first data flow from the packet of the first application.

In a possible implementation, after the keeping the first data flow still carried on the first network channel, the method further includes: detecting that transmission of the first data flow carried on the first network channel ends and no data flow is carried on the first network channel, and disabling the first network channel.

In a possible implementation, before it is detected that the second network channel is enabled, the method further includes: determining that the first application is an application in a preset whitelist.

In a possible implementation, the first network channel is a cellular channel, and the second network channel is a WiFi channel; or the first network channel is a secondary WiFi channel, and the second network channel is a primary WiFi channel.

According to a second aspect, an embodiment of this application provides an electronic device, including:

- a memory, where the memory is configured to store computer program code, the computer program code includes instructions, the electronic device has a plurality of network channels, a first application is run on the electronic device, the first application is carried on a first network channel, the first application includes a plurality of packet flows, and when the electronic device reads the instructions from the memory, the electronic device is enabled to perform the method according to any item of the first aspect.

According to a third aspect, an embodiment of this application provides a computer-readable storage medium. The computer-readable storage medium stores a computer program, and when the computer program is run on a computer, the computer is enabled to perform the method according to any item of the first aspect.

In a fourth aspect, an embodiment of this application provides a computer program. When the computer program is run on a computer, the method according to any item of the first aspect is performed.

In a possible design, the program in the fourth aspect may be fully or partially stored on a storage medium encapsulated with a processor, or may be fully or partially stored in a memory not encapsulated with a processor.

BRIEF DESCRIPTION OF THE DRAWINGS

To describe the technical solutions in the embodiments of the present invention more clearly, the following briefly describes the accompanying drawings used in describing the embodiments. Apparently, the accompanying drawings in the following description show merely some embodiments of the present invention, and a person of ordinary skill in the art may derive other drawings from these accompanying drawings without creative efforts.

FIG. 8 is a schematic diagram of a structure of a heartbeat flow packet according to an embodiment of this application;

FIG. 10 is a schematic diagram of a structure of a battle flow packet according to an embodiment of this application;

FIG. 17A is a schematic diagram of code implementation of registering a hook function according to an embodiment of this application;

FIG. 17B is a schematic diagram of code implementation of registering a hook function according to an embodiment of this application;

FIG. 18 is a schematic diagram of code implementation of a matching feature according to an embodiment of this application;

FIG. 19 is a schematic diagram of code implementation for packet filtering according to an embodiment of this application;

FIG. 21 is a schematic diagram of code implementation of a game battle flow according to an embodiment of this application.

DETAILED DESCRIPTION OF ILLUSTRATIVE EMBODIMENTS

Figure 1A:
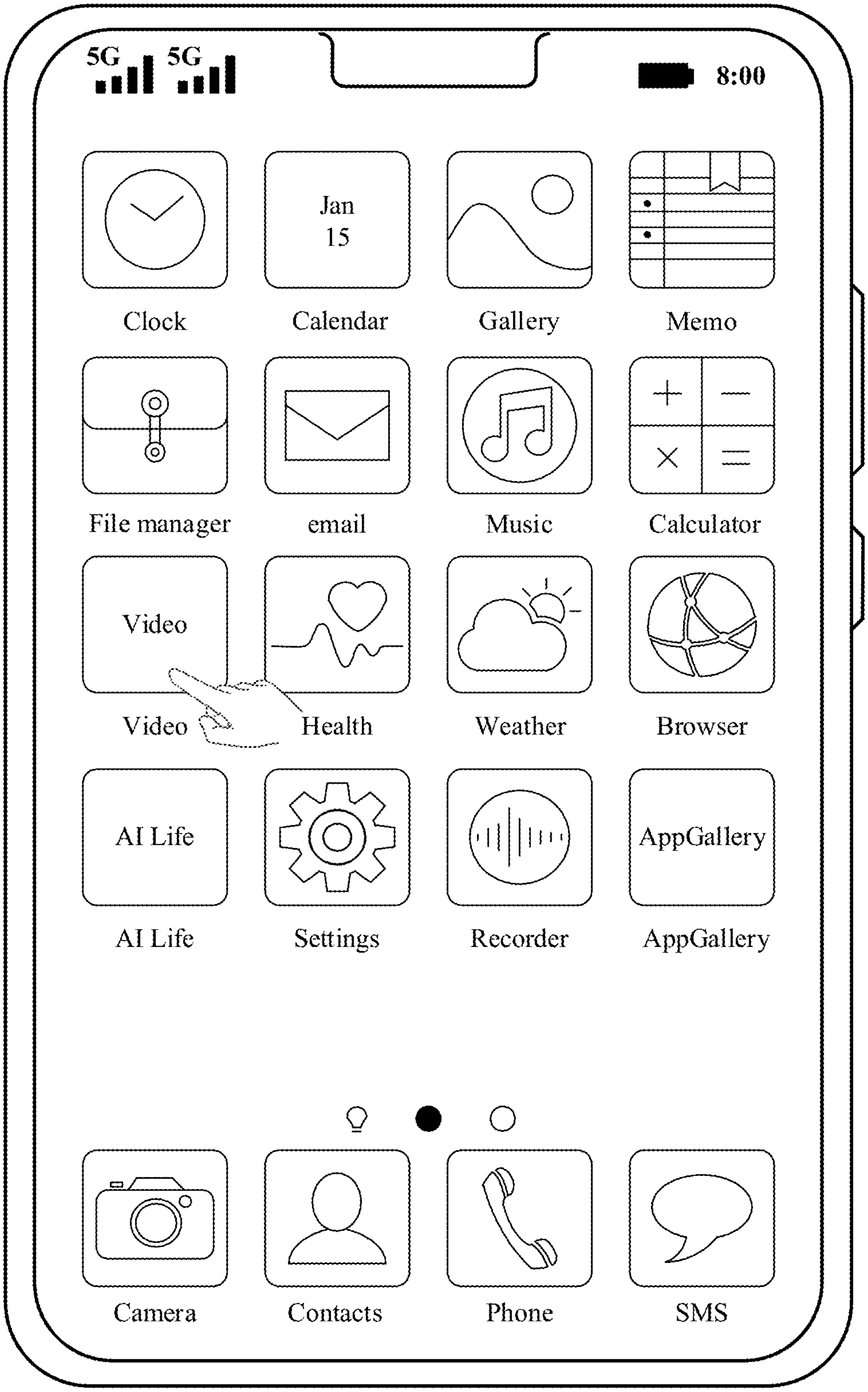
FIG. 1A is a schematic diagram of display of a mobile phone desktop according to an embodiment of this application.
Figure 1B:
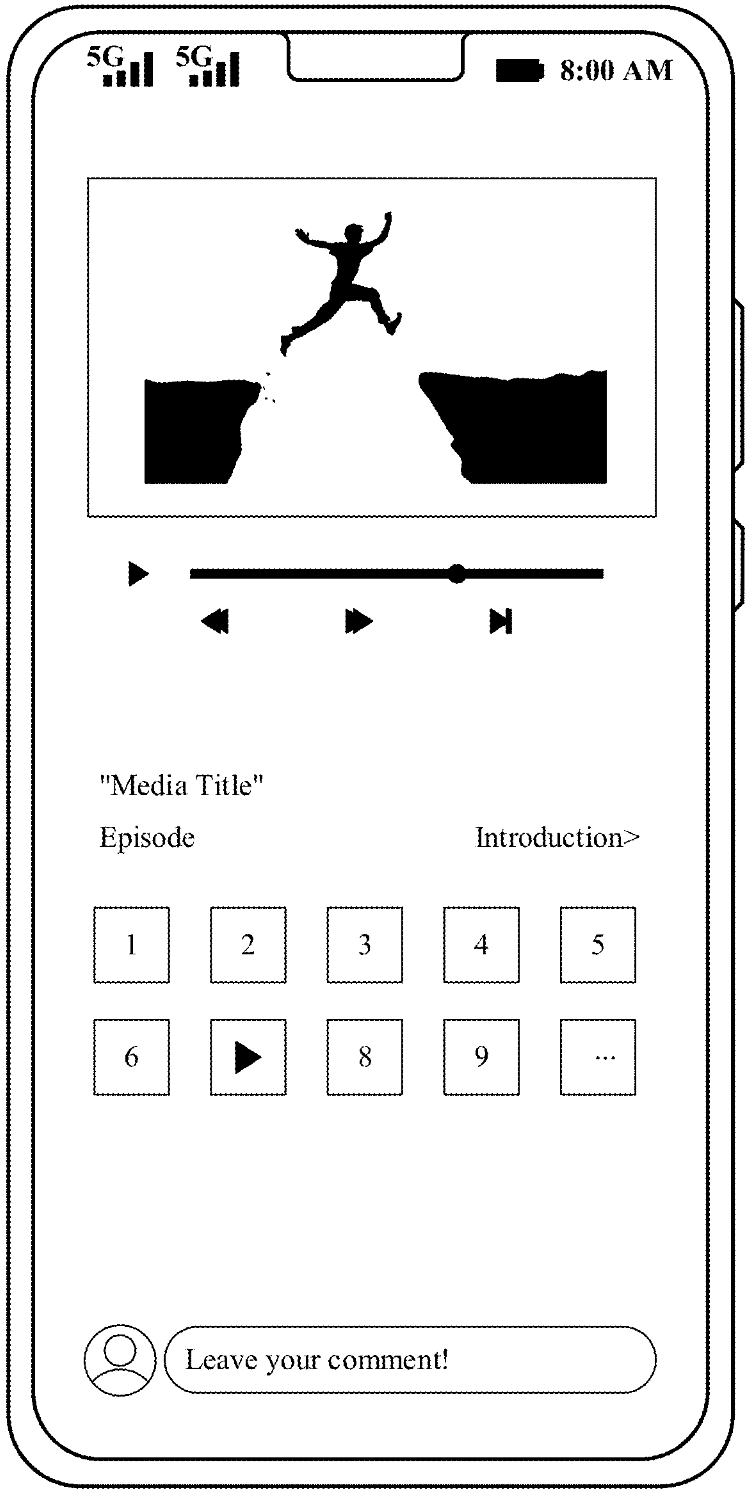
FIG. 1B is a schematic diagram of an application interface according to an embodiment of this application.

The following describes the technical solutions in the embodiments of this application with reference to the accompanying drawings in the embodiments of this application. In the description of the embodiments of this application, unless otherwise specified, "/" indicates that an "or" relationship. For example, A/B may represent A or B. "and/or" in this specification is merely an association relationship for describing associated objects, and represents that three relationships may exist. For example, A and/or B may represent the following three cases: Only A exists, both A and B exist, and only B exists.

In the following, the terms "first" and "second" are used merely for descriptive purposes, and cannot be understood as indicating or implying relative importance or implicitly indicating the quantity of indicated technical features. Therefore, a feature limited by "first" or "second" may expressly or implicitly include one or more of such features. In the description of the embodiments of this application, unless otherwise specified, "a plurality of" means two or more.

First, the terms mentioned in the embodiments of this application are described by way of example but not limitative description.

A WiFi network adapter is an apparatus that supports internet access through a wireless local area network (Wireless Local Area Network, WLAN).

A data service network adapter is an apparatus that supports network access through mobile communication technologies such as general packet radio service (General packet radio service, GPRS), enhanced data rate for GSM evolution (Enhanced Data Rate for GSM Evolution, EDGE), time division-synchronous code division multiple access (Time Division-Synchronous Code Division Multiple Access, TD-SCDMA), high speed downlink packet access (High Speed Downlink Packet Access, HSDPA), wideband code division multiple access (Wideband Code Division Multiple Access, WCDMA), long term evolution (Long Term Evolution, LTE), and 5th generation mobile communication technology (5th Generation Mobile Communication Technology, 5G).

A network channel is any route between two or more nodes in a network, or a route from a source address to a destination address in a network.

A network channel of an electronic device in the embodiments of this application means a route established between the electronic device using a network access apparatus such as the foregoing WiFi network adapter or data service network adapter and another electronic device such as a server. In the embodiments of this application, a network channel established by using the WiFi network adapter is referred to as a WiFi channel, and a network channel established by using a data service network adapter is referred to as a cellular channel.

A plurality of network channels may be preconfigured in the electronic device. For example, the plurality of network channels may include a primary WiFi channel, a secondary WiFi channel, a primary cellular channel, and a secondary cellular channel. The primary WiFi channel and the secondary WiFi channel may operate in a 2.4 GHz frequency band or a 5 GHz frequency band. For example, if the primary WiFi channel operates in the 2.4 GHz frequency band, the secondary WiFi channel operates in the 5 GHz frequency band; or if the primary WiFi channel operates in the 5 GHz frequency band, the secondary WiFi channel operates in the 2.4 GHz frequency band. In addition, the primary cellular channel and the secondary cellular channel may correspond to operator networks. For example, the primary cellular channel may use a SIM card 1 (the SIM card 1 belongs to an operator A), and the secondary cellular channel may use a SIM card 2 (the SIM card 2 belongs to an operator B). Usually, a priority of the primary WiFi channel is higher than those of the other three channels, and therefore the primary network channel is usually the primary WiFi channel. Usually, considering data traffic consumption of the electronic device, a priority of a WiFi channel is higher than a priority of a cellular channel. It can be understood that the preconfigured channels are merely examples for description, and do not constitute a limitation on the embodiments of this application, and in some embodiments, more or fewer channels may be included. In addition, using the primary WiFi channel as the primary network channel is merely a preferred solution, and does not constitute a limitation on the embodiments of this application. In some embodiments, another network channel may alternatively be selected as the primary network channel.

With the rapid development of electronic technologies and internet technologies, mobile devices such as mobile phones are more widely used in people's daily life. For example, mobile payment, gaming, and the like can be performed through mobile phones. To ensure normal running of common services (such as games, calls, and social software), usually a user's mobile phone is connected to a wireless network. However, in some scenarios, a current wireless network is not sufficient to meet a requirement of a service (for example, a signal of the mobile phone becomes poor), which causes stuck service running, thereby possibly reducing user experience.

A possible reason is that a flow of an application is switched between different network channels when a network environment changes. A mobile phone is used as an example. It is assumed that a wireless local area network switch in the mobile phone is turned on, a cellular mobile network switch is turned on, and the mobile phone is not in a known WiFi network. In this case, the mobile phone does not enable a WiFi channel, but uses a cellular channel to transmit a data flow of a network application located in a foreground (namely, a network application that is currently used by a user). In this case, if the mobile phone enters a WiFi network with historical usage information, the mobile phone automatically connects to the WiFi network and enables the WiFi channel. The priority of the WiFi channel is higher than the priority of the cellular channel, and a default network channel changes from the cellular channel to the WiFi channel. The flow of the network application is switched from the currently used cellular channel to the WiFi channel. If this switching process is slow, service running of the network application may be stuck, thereby reducing user experience. Especially for delay-sensitive services, such as game battles, video calls, and live streaming, network channel switching is more likely to cause stuck service running, which is more likely to affect user experience.

Therefore, an embodiment of this application provides a channel switching method, which can reduce a problem of stuck service running in a scenario of a network environment change, thereby improving user experience.

In the channel switching method in this embodiment of this application, when the electronic device detects a network environment change and a new network channel (for example, a WiFi channel) is automatically enabled, if a priority of the newly enabled network channel is higher than a priority of the currently used network channel (for example, a cellular channel), for each flow carried by the current network application on the currently used network channel (for example, a cellular channel), a network channel of each flow is not directly switched to the newly enabled network channel. Instead, whether to switch the network channel of each flow is determined in consideration of network quality of the currently used network channel and network quality of the newly enabled network channel, and/or in consideration of impact of each flow of the current network application on service running of the network application.

Optionally, according to impact on service running of the network application, flows of the network application may be classified into flows that have relatively large impact on service running of the network application and flows that have relatively small impact on service running of the network application. There may be different specific classification methods for different network applications, which are not limited in this embodiment of this application. For example, for a game application, a game battle flow is generally a flow that has relatively large impact on service running of the game application, and an interface data flow such as a game hall is generally a flow that has relatively small impact on service running of the game application. For a video play application, a video flow and an audio flow are generally flows that have relatively large impact on service running of the video play application, and an interface data flow such as a video list interface is generally a flow that has relatively small impact on service running of the video play application.

Optionally, a flow that is of the network application and that has relatively large impact on service running of the network application may be a flow that is sensitive to network quality parameters such as a delay and/or a packet loss rate.

In a possible implementation, whether to switch the network channel of each flow is determined in consideration of impact of each flow of the current network application on service running of the network application. Specifically, a flow that has relatively large impact on service running of the network application may be kept still carried on the currently used network channel without switching to the newly enabled network channel. A flow that has relatively small impact on service running of the network application may be switched to the newly enabled network channel.

In another possible implementation, based on the foregoing implementation, whether to switch the network channel of each flow may be further determined with reference to network quality of the currently used network channel and the newly enabled network channel. Optionally, for a flow that has relatively large impact on service running of the network application, if the network quality of the currently used network channel meets a transmission requirement of the flow, the flow may be kept still carried on the currently used network channel without switching to the newly enabled network channel; if the network quality of the currently used network channel does not meet the transmission requirement of the flow, the flow is switched to the newly enabled network channel. For a flow that has relatively small impact on service running of the network application, if the network quality of the newly enabled network channel meets the transmission requirement of the flow, the flow may be switched to the newly enabled network channel; if the network quality of the newly enabled network channel does not meet the transmission requirement of the flow, the flow may be kept still carried on the currently used network channel without switching to the newly enabled network channel.

According to the foregoing method, network channel switching can be reduced for a flow that has relatively large impact on service running of the network application, thereby reducing a problem of stuck service running caused by network channel switching, and improving user experience.

Applicable scenarios of the channel switching method in this embodiment of this application are described with reference to FIG. 1A to FIG. 3.

That a first device is a mobile phone and a flow of a preset type is a delay-sensitive flow is used as an example. FIG. 1A is a schematic diagram of a mobile phone desktop. As shown in FIG. 1A, a user may tap a video application icon on the mobile phone desktop to start a video application. In this way, a schematic diagram of video display shown in FIG. 1B may be obtained.

Figure 1C:
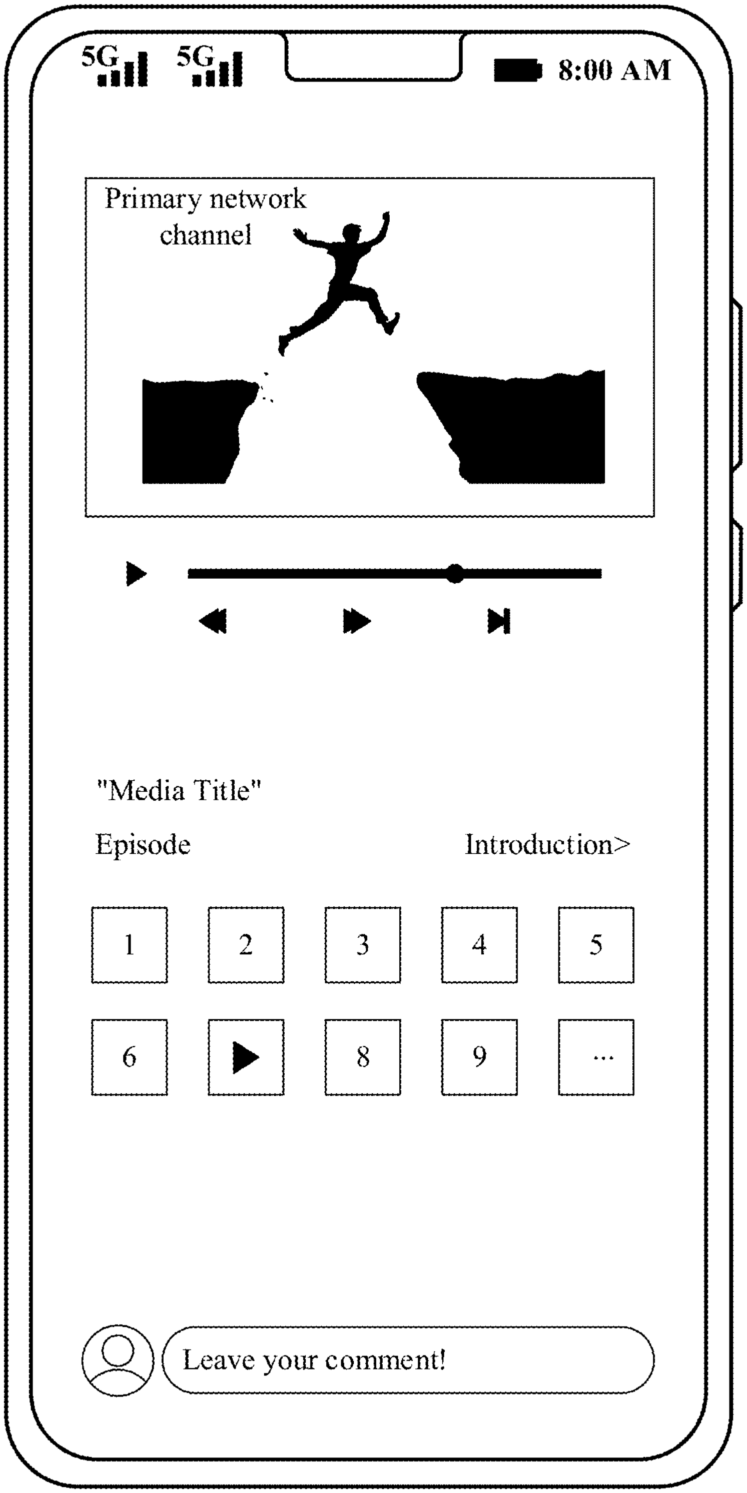
FIG. 1C is a schematic diagram of an application interface of a mobile phone using a primary network channel according to an embodiment of this application.

FIG. 1C is a schematic diagram of an effect after the mobile phone uses a primary network channel (for example, a cellular channel 1). As shown in FIG. 1C, there is no WiFi network in an environment of the mobile phone, and the mobile phone enables the cellular channel for the video application. After obtaining a path of the cellular channel, the mobile phone may use the cellular channel to watch a video.

It can be understood that a current network application (for example, the video application shown in FIG. 1C) may include a plurality of flows (for example, a video flow and an audio flow). The plurality of flows may be carried on the cellular channel.

Figure 1D:
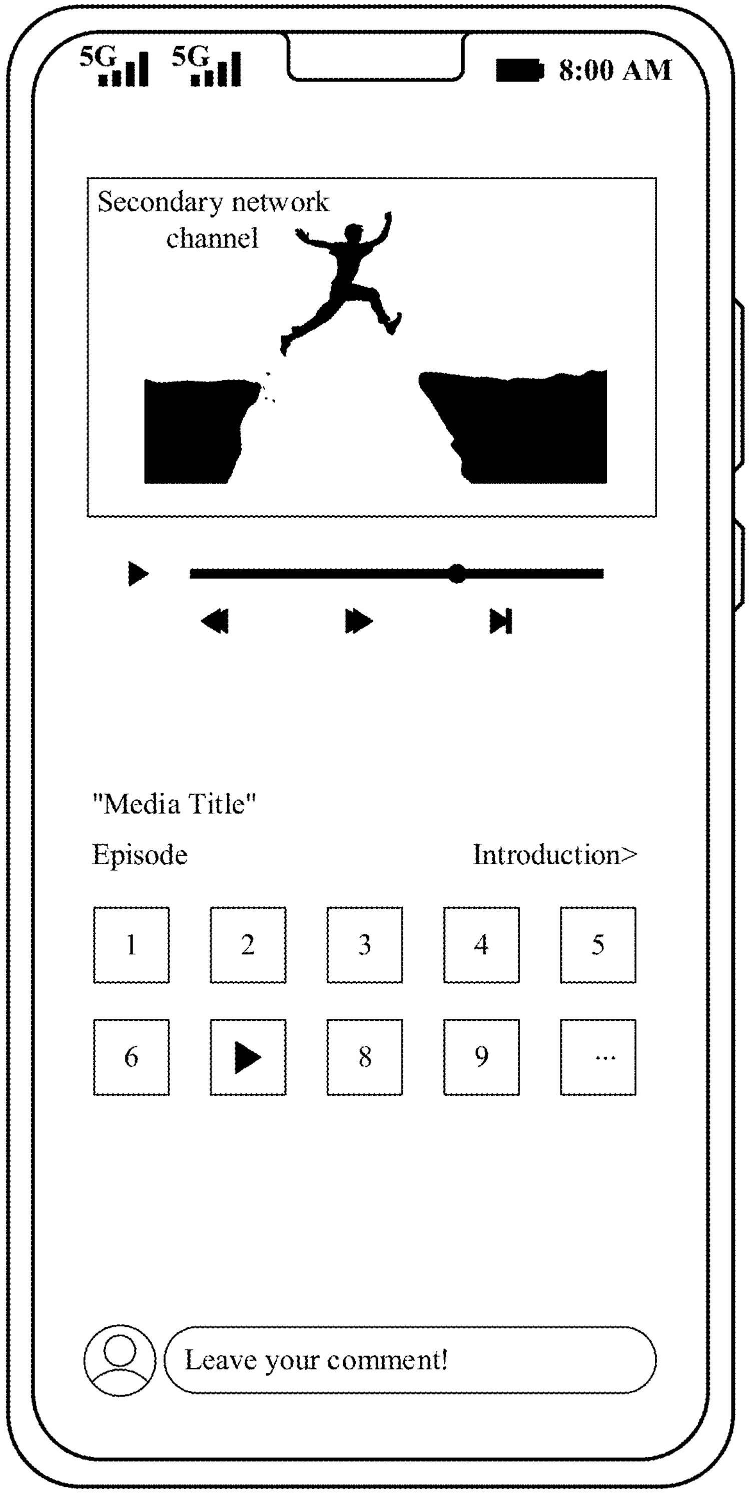
FIG. 1D is a schematic diagram of an application interface of a mobile phone using a secondary network channel according to an embodiment of this application.

FIG. 1D is a schematic diagram when the mobile phone uses a secondary network channel (for example, a cellular channel 2). After receiving a channel switching indication, the mobile phone may switch the voice flow and the video flow from the current primary network channel to the secondary network channel, and use the secondary network channel to watch the video, so as to avoid the video from being stuck.

Figure 1E:
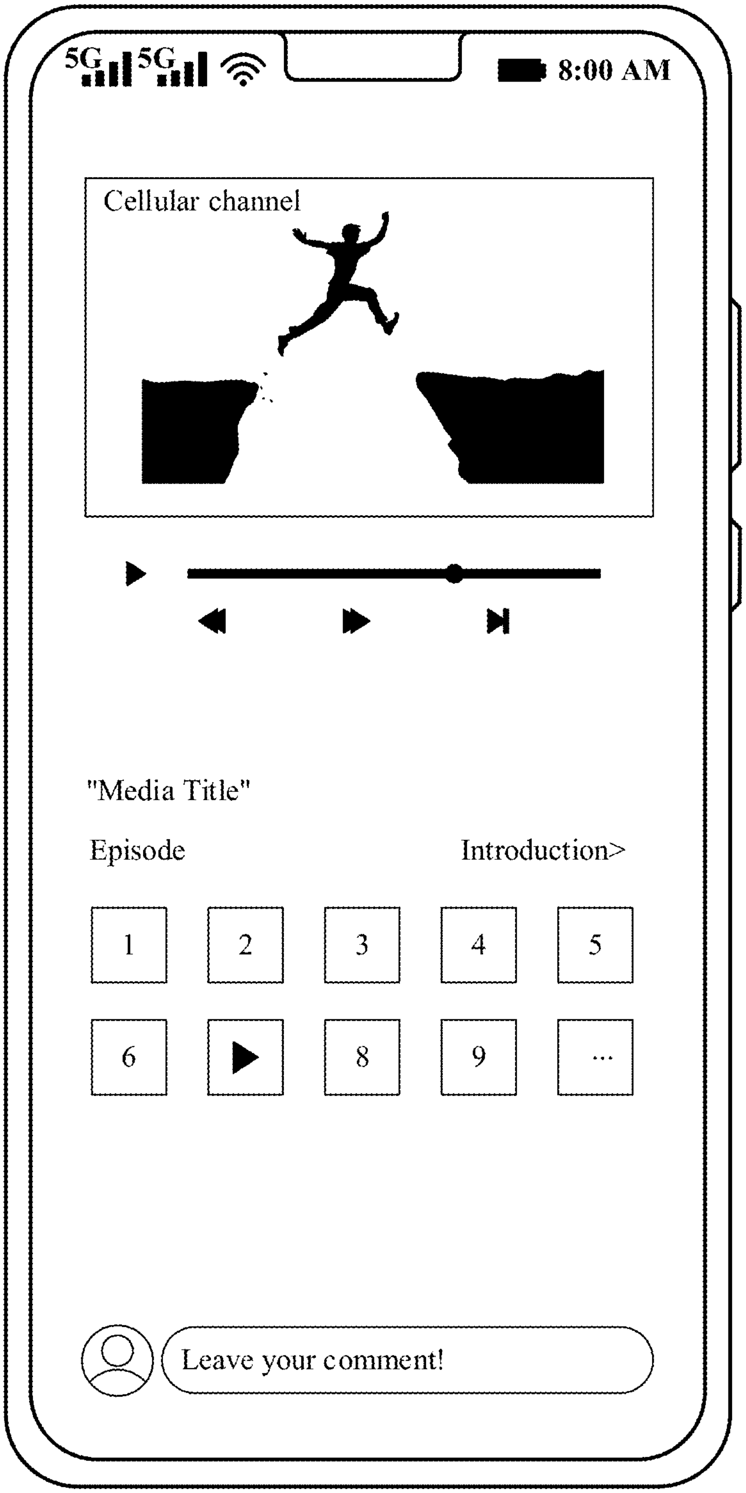
FIG. 1E is a schematic diagram of an application interface when a mobile phone enables a WiFi channel but still uses a cellular channel according to an embodiment of this application.

FIG. 1E is a schematic diagram when the mobile phone uses a WiFi channel. As shown in FIG. 1E, when the environment of the mobile phone changes and the mobile phone enters a coverage area of the WiFi network, the mobile phone detects a historical login record of the WiFi network, logs in to the WiFi network, and enables the WiFi channel. A default network channel is switched to the WiFi channel. However, the mobile phone detects that the video flow and the audio flow of the video application are delay-sensitive flows, and does not switch the video flow and the audio flow to the WiFi channel until transmission of the video flow and the audio flow ends, so as to avoid the video from being stuck.

After the WiFi channel is enabled, if starting to transmit a new delay-sensitive flow is needed, the delay-sensitive flow is carried on the WiFi channel. For example, after the WiFi channel is enabled, if the user chooses to play another video, a video flow and an audio flow of the video may be carried on the WiFi channel.

Figure 2:
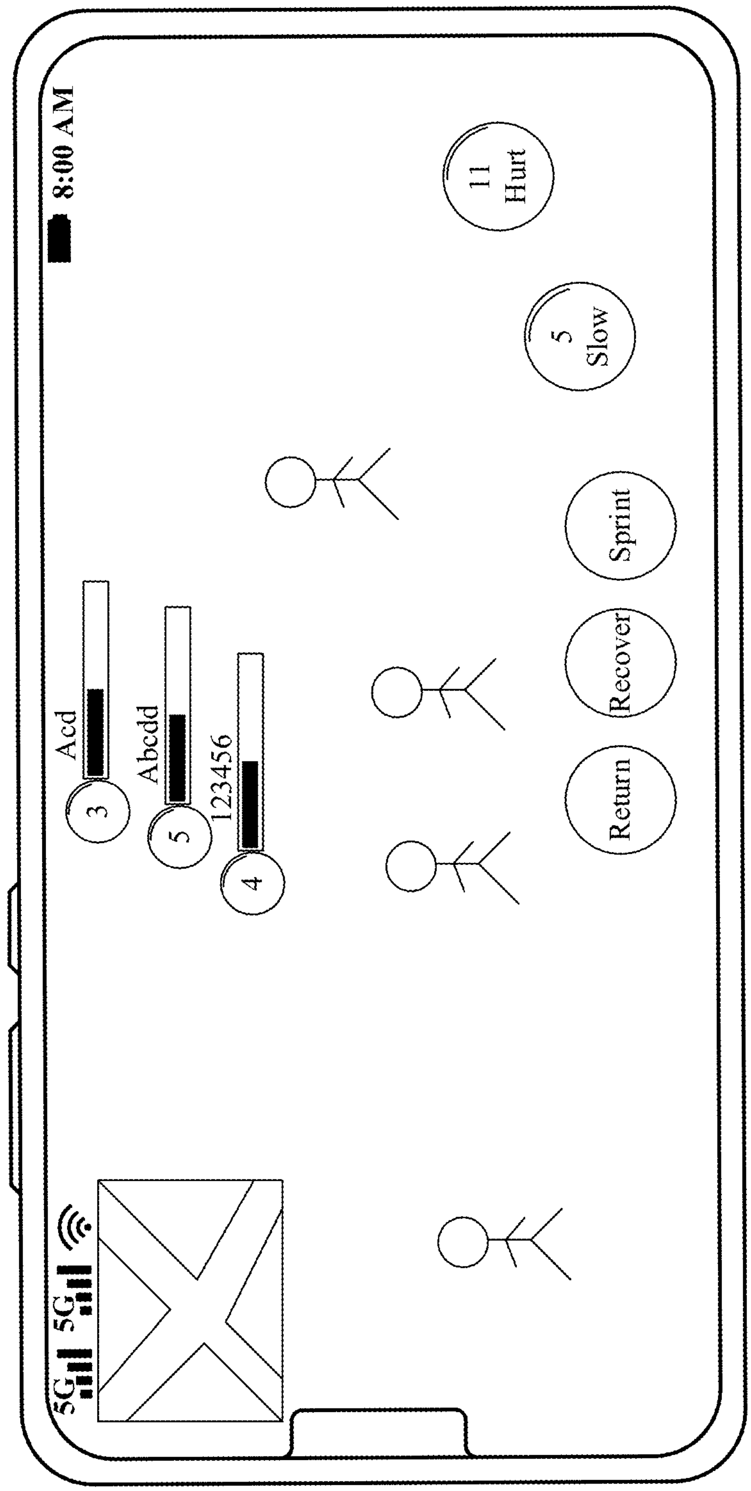
FIG. 2 and FIG. 3 are schematic diagrams of a game interface.
Figure 3:
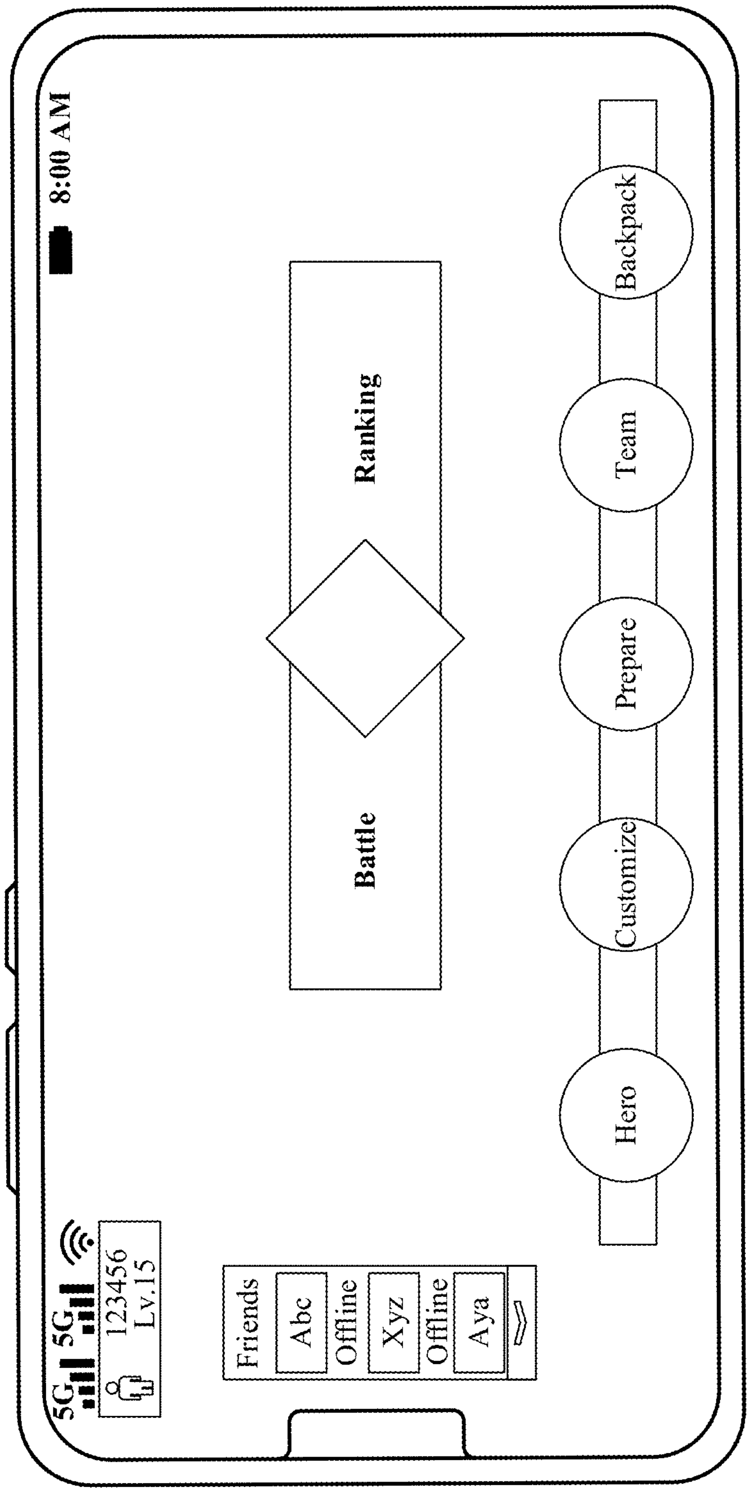

FIG. 2 and FIG. 3 are schematic diagrams of a game interface. As shown in FIG. 2, the game interface of the mobile phone is a game battle interface. The mobile phone does not enable the WiFi channel, and enables only the cellular channel. In this case, a default network channel is the cellular channel, and a game battle flow is carried on the cellular channel of the mobile phone. An environment of the mobile phone changes, and the mobile phone enters a coverage area of a WiFi network. The mobile phone detects a historical login record of the WiFi network, logs in to the WiFi network, and enables the WiFi channel. The default network channel is switched to the WiFi channel. However, the mobile phone detects that the game battle flow is a delay-sensitive flow, and although the default network channel is switched to the WiFi channel, the game battle flow is still carried on the cellular channel, so as to avoid a game team battle from being stuck.

As shown in FIG. 3, the game interface of the mobile phone is a game hall. The mobile phone does not enable the WiFi channel, and enables only the cellular channel. In this case, the default network channel is the cellular channel. A flow that the game application needs to transmit is an interface data flow, and the interface data flow is carried on the cellular channel of the mobile phone. When the environment of the mobile phone changes, and the mobile phone enters a coverage area of a WiFi network. The mobile phone detects a historical login record of the WiFi network, logs in to the WiFi network, and enables the WiFi channel. The default network channel is switched to the WiFi channel. The mobile phone detects that the interface data flow is a non-delay-sensitive flow. In consideration of a status of the WiFi channel, the interface data flow is switched to the WiFi channel, so as to reduce data traffic consumption of the mobile phone.

The foregoing channel switching method may be applied to the first device. The first device may be a mobile terminal, a terminal device, user equipment (User Equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The first device may be a station (STAION, ST) in a WLAN, or may be a cellular phone, a cordless phone, a session initiation protocol (Session Initiation Protocol, SIP) phone, a wireless local loop (Wireless Local Loop, WLL) station, a personal digital Processing (Personal Digital Assistant, PDA) device, a handheld device having a wireless communication capability a computing device or another processing device connected to a wireless modem, a vehicle-mounted device, a terminal of an internet of vehicle, a computer, a laptop computer, a handheld communication device, a handheld computing device, a satellite wireless device, a wireless modem card, a set top box (Set Top Box, STB), customer premise equipment (Customer Premise Equipment, CPE), and/or another device and a next generation communication system used for communication over a wireless system, for example, a mobile terminal in a 5G network or a mobile terminal in a future evolved public land mobile network (Public Land Mobile Network, PLMN) network. The first device may alternatively be a wearable device. The wearable device may also be referred to as a wearable smart device, which is a generic term for wearable devices that are developed through intelligent design on daily wearables by using wearable technologies, such as glasses, gloves, watches, clothing, and shoes. The wearable device is a portable device that is worn directly on a body or integrated into a user's clothing or accessories. The wearable device is not only a hardware device, but also implements powerful functions through software support, data interaction, and cloud interaction. In a broad sense, the wearable smart device may include a full-featured and large-size device that can implement some or all of functions without relying on a smart phone, for example a smart watch or smart glasses, and a device that focuses only on a specific type of application function and needs to be used together with another device such as a smart phone, for example, various types of smart bands and smart jewelry that monitor physical signs.

It can be understood that the scenario of using the first device to play an online game is merely described as an example and does not constitute a limitation on the embodiment of this application. In some embodiments, a scenario such as using the first device to listen to online music or watch a video may be further included.

Figure 4:
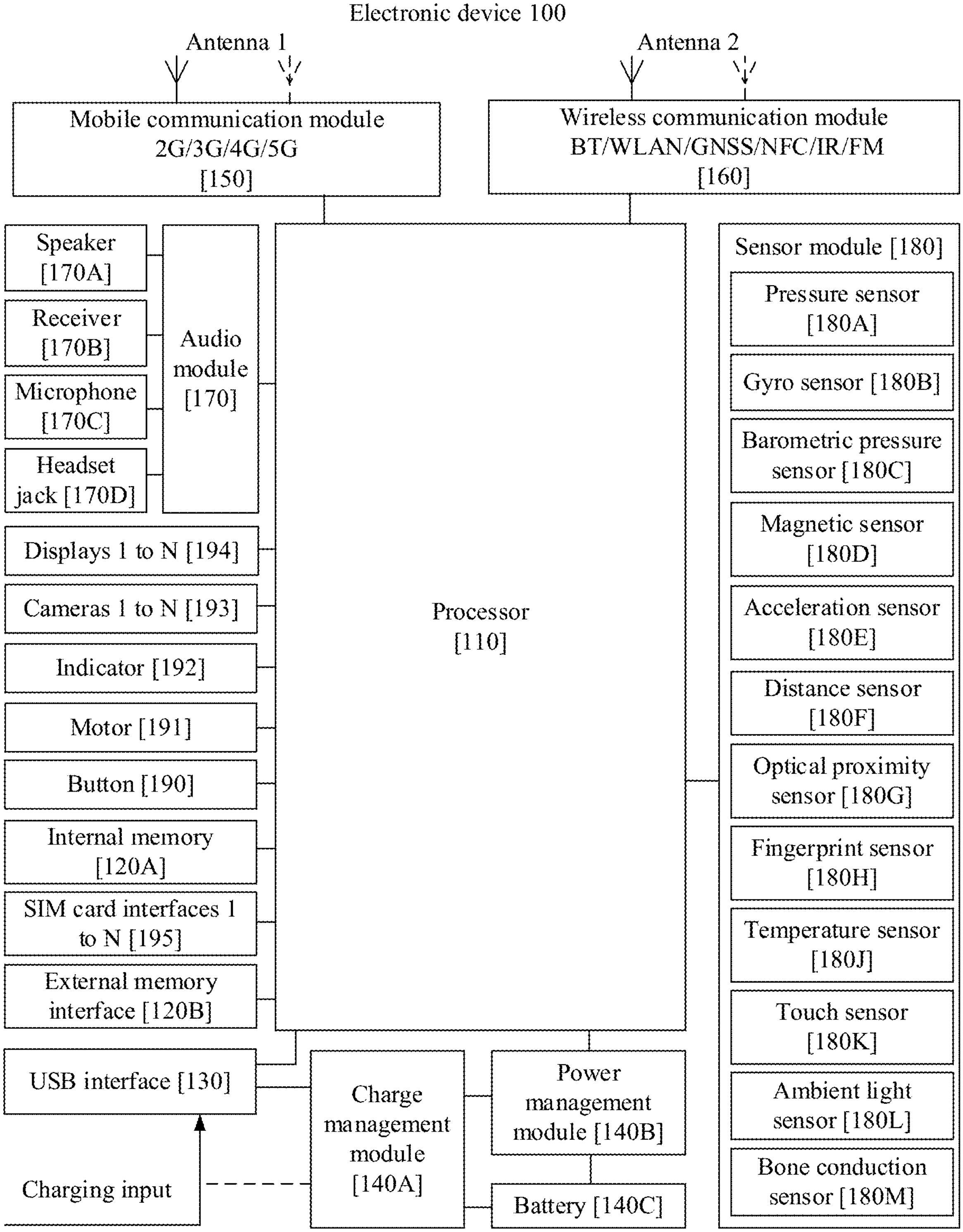
FIG. 4 is a schematic diagram of a hardware structure of an electronic device according to an embodiment of this application.

The following first describes an example electronic device provided in the following embodiment of this application. FIG. 4 is a schematic diagram of a structure of an electronic device 100, and the electronic device 100 may be the foregoing first device.

The electronic device 100 may include a processor 110, an external memory interface 120B, an internal memory 120A, a universal serial bus (universal serial bus, USB) interface 130, a charging management module 140A, a power management module 140B, a battery 140C, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It may be understood that a structure shown in this embodiment of this application does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented in hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be independent devices, or may be integrated in one or more processors. The controller may be a nerve center and a command center of the electronic device 100. The controller may generate an operation control signal based on an instruction operation code and a timing signal, to implement control on instruction fetching and execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

Execution of the screenshot taking method provided in the embodiments of this application may be controlled by the processor 110 or implemented by invoking other components, for example, invoking a processing program in the embodiments of this application stored in the internal memory 120A, to implement a user's screenshot taking operation and improve user experience.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The USB interface 130 is an interface that conforms to the USB standard specification, and may specifically be a mini USB interface, a micro USB interface, a USB Type-C interface, or the like. The USB interface 130 may be configured to connect to the charger to charge the electronic device 100, and may also be configured to transmit data between the electronic device 100 and a peripheral device. It may also be configured to connect to a headset, so as to play audio through the headset. The interface may be further configured to connect to another electronic device such as an AR device.

It can be understood that an interface connection relationship between modules illustrated in this embodiment of this application is merely an illustrative description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some function modules of the mobile communication module 150 may be disposed in the same device as at least some modules of the processor 110.

The modem processor may include a modulator and a demodulator. The modulator is configured to modulate to-be-sent low frequency baseband signals into medium and high frequency signals. The demodulator is configured to demodulate a received electromagnetic wave signal into a low frequency baseband signal. Then the demodulator transmits the demodulated low frequency baseband signal to the baseband processor for processing. The low frequency baseband signal is processed by the baseband processor and then passed to the application processor. The application processor outputs a sound signal through an audio device (not limited to the speaker 170A, the receiver 170B, or the like), or displays an image or a video through the display 194. In some embodiments, the modem processor may be a separate device. In some other embodiments, the modem processor may be independent of the processor 110, and provided in a same device as the mobile communication module 150 or another function module.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP may further optimize parameters, such as exposure and color temperature, of a shooting scene. In some embodiments, the ISP may be provided in the camera 193.

The camera 193 is configured to capture a static image or a video. An optical image of an object is generated through the lens, and is projected onto a photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a format such as standard RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, and simulates a biological neural network structure such as a transmission mode between neurons in a human brain to perform rapid process on input information, and can perform continuous self-learning. The NPU can implement applications such as intelligent cognition of the electronic device 100, for example, image recognition, facial recognition, speech recognition, and text understanding.

The external memory interface 120B may be configured to connect to an external memory card, for example, a micro SD card, to extend a storage capability of the electronic device 100. The external storage card communicates with the processor 110 through the external memory interface 120B, to implement a data storage function. For example, files such as music and videos are stored in the external storage card.

The internal memory 120A may be configured to store computer-executable program code. The internal memory 120A may include a program storage area and a data storage area. The program storage area may store an operating system, an application required for at least one function (such as a sound play function and an image play function), and the like. The data storage area may store data (such as audio data and a phone book) created based on use of the electronic device 100, and the like. In addition, the internal memory 120A may include a high-speed random access memory, and may further include a non-volatile memory, for example, at least one magnetic disk storage device, a flash memory device, and a universal flash storage (universal flash storage, UFS). The processor 110 performs various function applications and data processing of the electronic device 100 by running the instructions stored in the internal memory 120A and/or instructions stored in a memory provided in the processor.

The electronic device 100 may implement an audio function such as music play and recording through the audio module 170, the speaker 170A, the receiver 170B, the microphone 170C, the headset jack 170D, the application processor, and the like.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

In this embodiment of this application, screen touch data of a user may be obtained through the touch sensor 180K, and the touch screen data may be sent to the processor 110 for processing.

The button 190 includes a power button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration alert. The motor 191 may be used for vibration alerts for incoming calls, and may also be used for touch vibration feedback. For example, touch operations on different applications (such as photographing and audio playing) may correspond to different vibration feedback effects. For touch operations on different regions of the display 194, the motor 191 may also correspondingly generate different vibration feedback effects. Different application scenarios (such as a time reminder, information receiving, an alarm clock, and a game) may also correspond to different vibration feedback effects. The touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support nano SIM cards, micro SIM cards, SIM cards, and the like. A plurality of cards may be inserted into a same SIM card interface 195. Types of the plurality of cards may be the same as or different. The SIM card interface 195 may also be compatible with different types of SIM cards. The SIM card interface 195 may also be compatible with an external memory card. The electronic device 100 interacts with a network through the SIM card to implement functions such as calls and data communication. In some embodiments, the electronic device 100 uses an eSIM, namely, an embedded SIM card. The eSIM card may be embedded into the electronic device 100, and cannot be separated from the electronic device 100.

Figure 5:
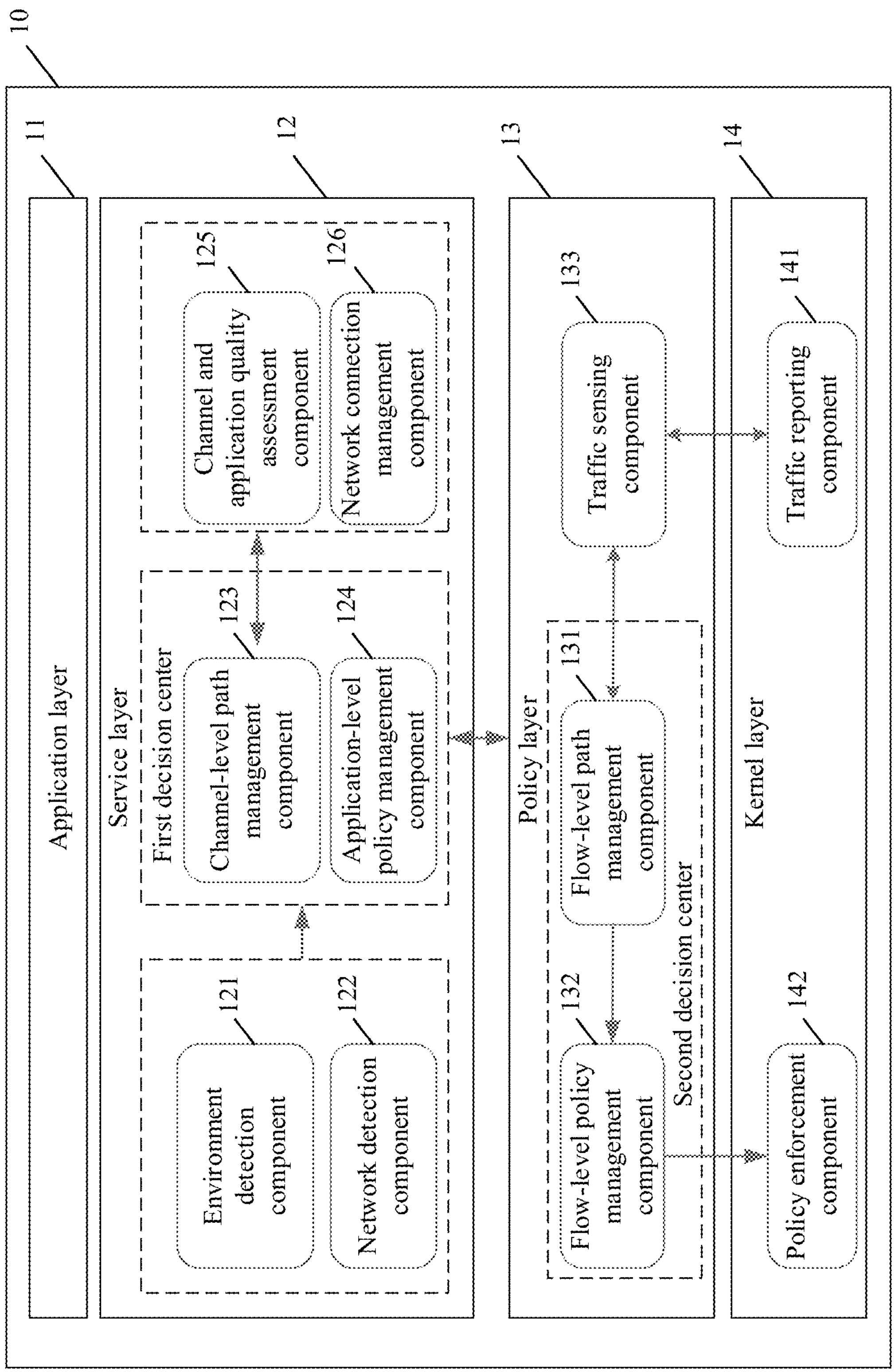
FIG. 5 is a schematic diagram of a software architecture of an electronic device according to an embodiment of this application.

Next, a system framework diagram of the foregoing first device is described. As shown in FIG. 5, the first device 10 includes an application layer 11, a service layer 12, a policy layer 13, and a kernel layer 14.

The application layer 11 may be configured to provide a plurality of network applications, and the network applications may be a third-party application or a system application, for example, a network application such as game, music, or video. A type of the network application provided by the application layer 11 is not specifically limited in this application. The network application herein is an application that needs to use a network channel of the first device 10 to obtain a resources from a network.

The service layer 12 may include an environment detection component 121, a network detection component 122, a channel-level path management component 123, an application-level policy management component 124, and a channel and application quality assessment component 125. The environment detection component 121 may be configured to detect a status of an application. For example, the status of the application may include states of application exited, application started, application running, application installed, and application uninstalled. It can be understood that the states are merely described as an example, and more states may also be included. Details are not described herein. The network detection component 122 may be configured to detect an enabling status of a network channel. The channel-level path management component 123 may be configured to be responsible for requesting/disabling a network channel, sensing a state change of a network channel, and updating a network channel selection policy, and may be further configured to store paths of a plurality of network channels. The application-level policy management component 124 may generate, based on input information, different policies for enforcement. For example, the policy may be to enable an acceleration function of a network channel, or enable traffic sensing (for example, to detect traffic of a network channel) or the like. The channel and application quality assessment component 125 may be configured to assess quality of a network channel. The service layer 12 may further include a network connection management component 126, configured to enabling a network channel, that is, change the network channel from a sleep state to an awake state. A network channel in the awake state may be directly used.

The policy layer 13 may include a flow-level path management component 131, a flow-level policy management component 132, and a traffic sensing component 133. The flow-level path management component 131 may be configured to update, based on an upper-layer policy change, selection of a network channel, trigger detection of quality of a network channel, and dynamically select an optimal channel, and may be further configured to store paths of different network channels, for example, store paths of a network channel currently used by an application (for example, a primary network channel) and a secondary network channel. The flow-level policy management component 132 may be configured to indicate network channel switching, and may be further be configured to store a network channel switching policy of a flow in the network application. The traffic sensing component 133 may be configured to collect statistics on reported traffic and assess network quality of each flow.

The kernel layer 14 may include a traffic reporting component 141 and a policy enforcement component 142. The traffic reporting component 141 may be configured to collect and report traffic information. The policy enforcement component 142 may be configured to perform network channel switching.

It can be understood that an interface connection relationship between the components illustrated in this embodiment of this application is merely an illustrative description, and does not constitute a limitation on a structure of the first device. In some other embodiments of this application, the first device may alternatively use an interface connection manner different from that in the foregoing embodiment, or use a combination of a plurality of interface connection manners.

Figure 6:
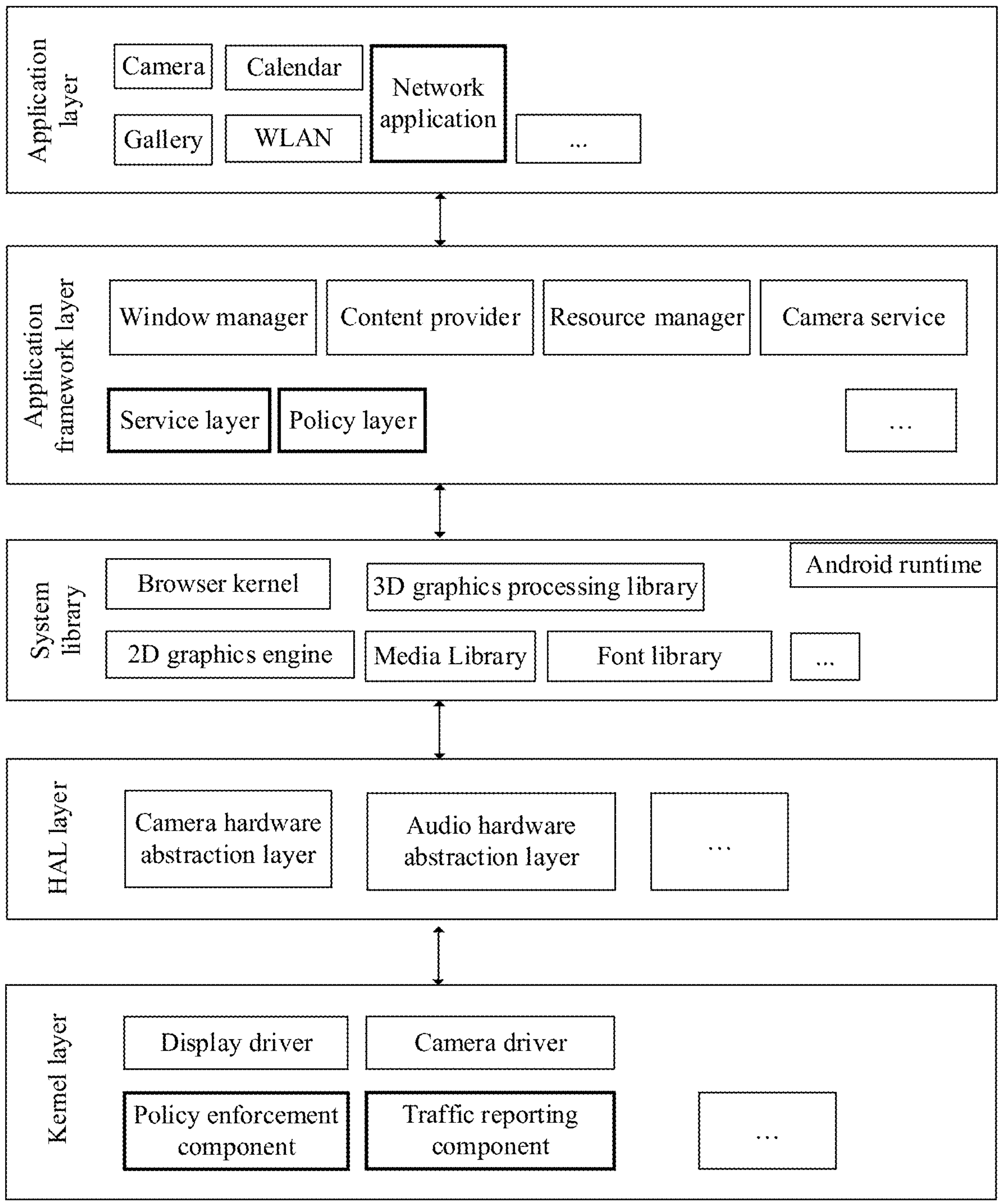
FIG. 6 is a schematic diagram of another software architecture of an electronic device according to an embodiment of this application.

The system framework shown in FIG. 5 above is merely used to illustrate implementation of a layered architecture of the first device. The system architecture shown in FIG. 5 may also be implemented as a part of an existing layered software architecture. An Android (Android) system is used as an example. FIG. 6 is a block diagram of a software structure of an electronic device of an Android system according to an embodiment of this application. Software is divided into a plurality of layers by using the layered architecture, and each layer has a clear role and task. The layers communicate with each other through a software interface. In the embodiment of this application shown in FIG. 6, the Android system is divided into five layers from top to bottom: an application layer, an application framework layer (also referred to as a system framework layer), a system library and Android runtime layer, a hardware abstraction layer (hardware abstraction layer, HAL), and a kernel layer.

The application layer includes a plurality of application programs (referred to as applications below), such as Camera, Gallery, Calendar, and WLAN. In a possible example, the application layer in the system architecture shown in FIG. 5 may correspond to this application layer. The application layer of the electronic device shown in FIG. 6 may include network applications described in the embodiments of this application, such as a video play application and a game application.

The application framework layer provides an application programming interface (Application Programming Interface, API) and a programming framework for applications in the application layer, including various components and services to support developers' Android development. The application framework layer further includes some predefined functions. For example, the application framework layer may include a window manager, a content provider, a resource manager, a camera service, and the like. In a possible example, the service layer and the policy layer in the system architecture shown in FIG. 5 may be located at the application framework layer.

The system library and Android runtime layer includes a system library and an Android runtime (Android Runtime). The system library may include a plurality of function modules, such as a surface manager, a 2D graphics engine, a 3D graphics processing library (such as OpenGL ES), a media library, and a font library.

The HAL layer is an interface layer located between an operating system kernel and a hardware circuit. The HAL layer includes but is not limited to: an audio hardware abstraction layer (Audio HAL) and a camera hardware abstraction layer (Camera HAL).

The kernel layer is a layer between hardware and software. The kernel layer includes a display driver, a camera driver, an audio driver, a sensor driver, and the like. In a possible example, the kernel layer in the system architecture shown in FIG. 5 may correspond to the kernel layer in the software architecture shown in FIG. 6. In this case, as shown in FIG. 6, the kernel layer may include a traffic reporting component and a policy enforcement component.

The channel switching method in the embodiment of this application is described as an example below with reference to the first device shown in FIG. 4 to FIG. 6.

Figure 7A:
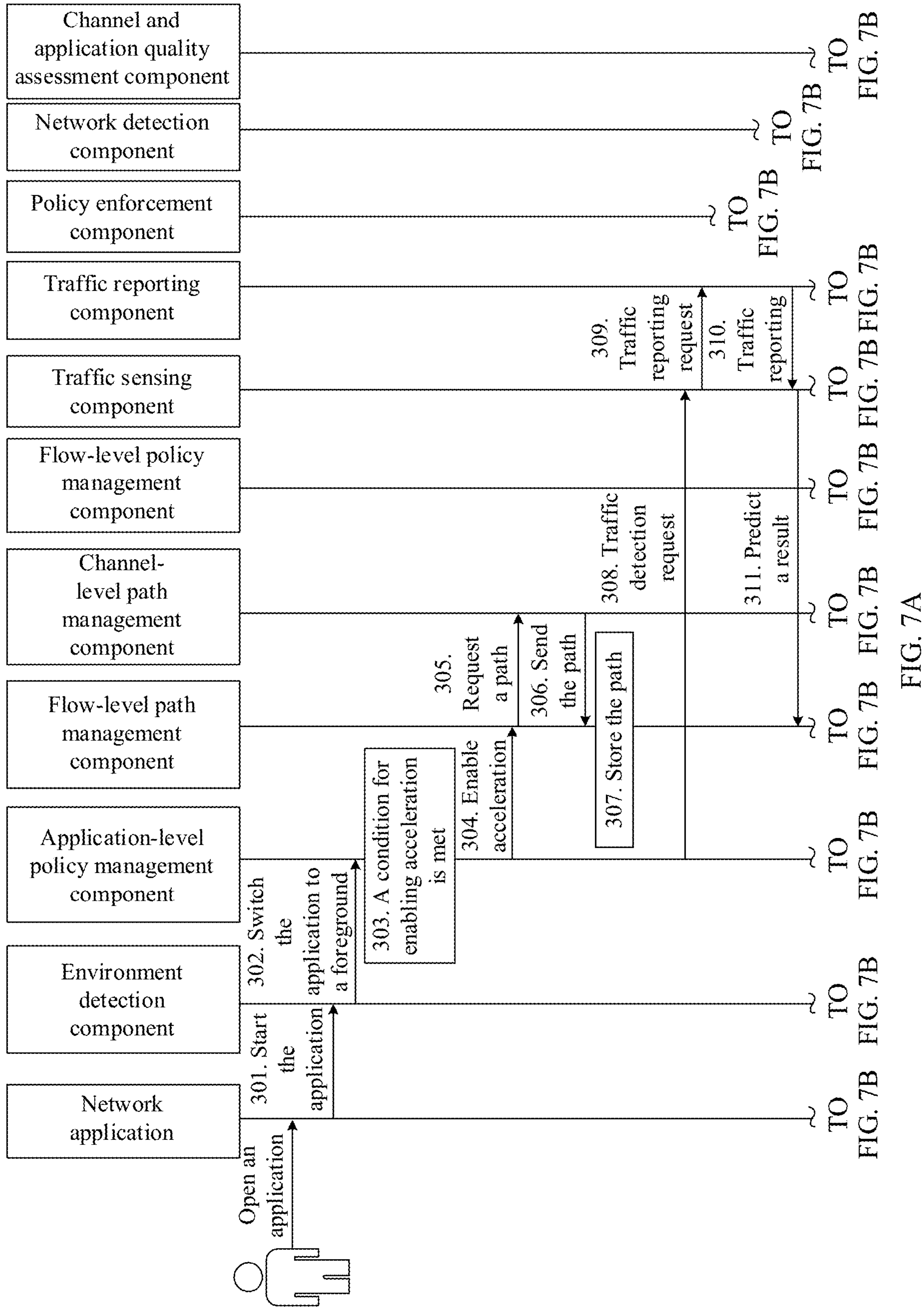
FIG. 7A and FIG. 7B are a schematic flowchart of an embodiment of a channel switching method according to this application.
Figure 7B:
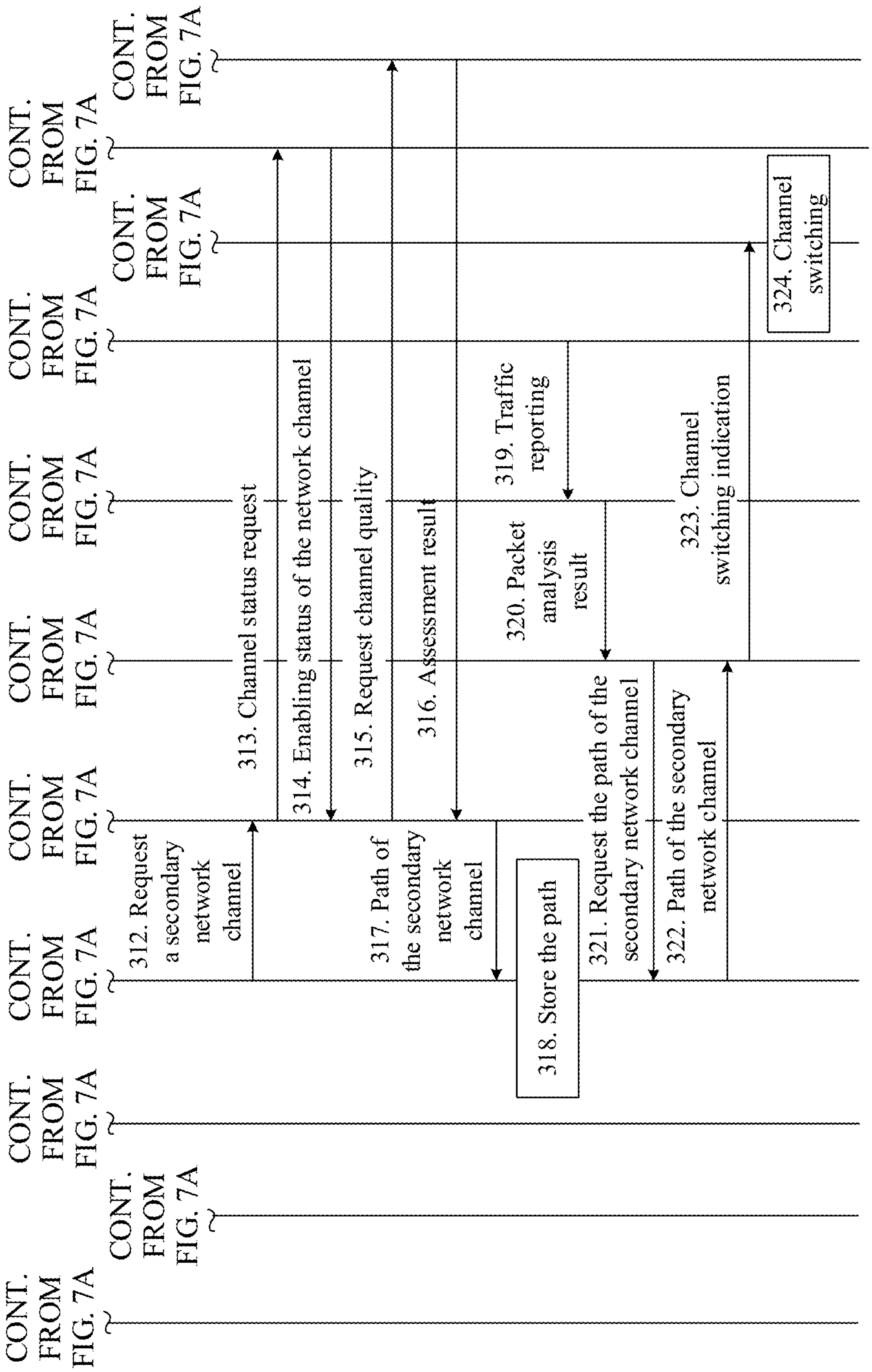

FIG. 7A and FIG. 7B are a schematic flowchart of an embodiment of a channel switching method according to an embodiment of this application, including:

Step 301: Start a network application in response to an operation of a user.

Specifically, the user may perform a starting operation in a first device to start a network application. For example, the user may tap an icon of the network application in the first device. In response to the operation of the user, an application layer 11 of the first device starts the network application. It can be understood that the foregoing example merely illustrates a scenario of starting the network application by tapping, and does not constitute a limitation on this embodiment of this application. In some embodiments, another operation (for example, double-tap or slide) may alternatively be used to start the network application. The network application may be a network-type application such as an online game, an online video, or online music.

FIG. 1A is a schematic diagram of a mobile phone desktop. As shown in FIG. 1A, a user may tap a video application icon on the mobile phone desktop to start a video application. In this way, a schematic diagram of video display shown in FIG. 1B may be obtained.

Step 302: The environment detection component 121 detects that the network application is switched to a foreground or a network changes, and notifies the application-level policy management component 124.

Specifically, the environment detection component 121 in the service layer 12 in the first device may continuously detect a status of the network application or a network environment. When detecting that any network application is switched to the foreground or the network environment changes, the environment detection component 121 may send a first notification message to the application-level policy management component 124. The first notification message may be used to notify the application-level policy management component 124 that the network application is already switched to the foreground or the network environment already changes. It can be understood that the first notification message may further include an identity of the network application (for example, the identity of the network application may be a UID), and the identity may be used to identify a unique identity of the network application.

For example, the identity of the network application may be implemented by using the following code:

```
kuid_t sock_i_uid(struct sock *sk)
{ kuid_t uid
  read_lock_bh(&sk->sk_callback_lock);
  uid=sk->sk_socket?SOCK_INODE(sk->sk_socket)->i_uid:
GLOBAL_ROOT_UID;
  read_unlock_bh(&sk->sk_callback_lock);
  reurn uid;
}
EXPORT_SYMBOL(sock_i_uid)
```

Step 303: The application-level policy management component 124 receives the first notification message sent by the environment detection component 121, and determines whether the current network application meets a condition for enabling acceleration.

Specifically, after receiving the first notification message sent by the environment detection component 121, the application-level policy management component 124 may determine, from the first notification message, that the network application is already switched to the foreground. Next, the application-level policy management component 124 may further determine whether the network application is included in a preset application whitelist.

During specific implementation, the application whitelist may be preset in the application-level policy management component 124, the application whitelist may include a plurality of network applications, and each network application may be identified by the foregoing identity. The application whitelist may be used to represent a network application for which acceleration can be enabled. The network applications in the preset application whitelist may include service types. For example, the service types of the network applications in the preset application whitelist may all be sensitive services, and the sensitive services may include a delay-sensitive service, a packet loss rate-sensitive service, and the like. Whether a network application in the first notification message is included in the preset application whitelist may be determined by comparing an identity of the network application in the first notification message with an identity of the network application in the preset application whitelist. If the network application in the first notification message is included in the preset application whitelist, it may be determined that the network application meets the condition for enabling acceleration. If the network application in the first notification message is not included in the preset application whitelist, it may be determined that the network application does not meet the condition for enabling acceleration.

For example, Table 1 is a whitelist of network applications.

TABLE 1

| Application name | Feature flow type | Channel quality parameter |
|---|---|---|
| Baidu Netdisk | Download flow | Rate |
| WeChat | Video flow | Delay/packet loss |
| Game | Battle flow | Delay/packet loss |

It can be understood that, if the current network application is not in the preset application whitelist, that is, the service type of the current network application is a non-sensitive service, when the first device detects that a primary network channel becomes poor, another network channel with better quality may be further detected. In this way, the non-sensitive service may be directly switched to the network channel with better quality.

Step 304: The application-level policy management component 124 sends a channel enabling message to the flow-level path management component 131 to enable a network channel.

Specifically, if the application-level policy management component 124 determines that the current network application meets the condition for enabling acceleration, it may send the channel enabling message to the flow-level path management component 131. The channel enabling message is used to indicate that the flow-level path management component 131 can enable a network channel (for example, the primary network channel).

Step 305: The flow-level path management component 131 requests a path of the primary network channel from the channel-level path management component 123.

Specifically, after receiving the channel enabling message sent by the application-level policy management component 124, the flow-level path management component 131 may send a primary network channel request to the channel-level path management component 123. The primary network channel request is used to request the path of the primary network channel. For example, the primary network channel may be a primary WiFi channel.

Step 306: The channel-level path management component 123 sends the path of the primary network channel to the flow-level path management component 131.

Specifically, paths of a plurality of network channels may be preconfigured in the channel-level path management component 123. For example, the plurality of network channels may include a primary WiFi channel, a secondary WiFi channel, a primary cellular channel, and a secondary cellular channel. The primary WiFi channel and the secondary WiFi channel may operate in a 2.4 GHz frequency band or a 5 GHz frequency band. For example, if the primary WiFi channel operates in the 2.4 GHz frequency band, the secondary WiFi channel operates in the 5 GHz frequency band; or if the primary WiFi channel operates in the 5 GHz frequency band, the secondary WiFi channel operates in the 2.4 GHz frequency band. In addition, the primary cellular channel and the secondary cellular channel may correspond to operator networks. For example, the primary cellular channel may use a SIM card 1 (the SIM card 1 belongs to an operator A), and the secondary cellular channel may use a SIM card 2 (the SIM card 2 belongs to an operator B). Usually, a priority of the primary WiFi channel is higher than those of the other three channels, and therefore the primary network channel is usually the primary WiFi channel. It can be understood that the preconfigured channels are merely examples for description, and do not constitute a limitation on the embodiments of this application, and in some embodiments, more channels may be included. In addition, using the primary WiFi channel as the primary network channel is merely a preferred solution, and does not constitute a limitation on the embodiments of this application. In some embodiments, another network channel may alternatively be selected as the primary network channel.

After receiving the primary network channel request sent by the flow-level path management component 131, the channel-level path management component 123 may select a network channel from the plurality of network channels as the primary network channel (for example, the primary network channel is the primary WiFi channel), and send a path of the primary network channel to the flow-level path management component 131.

Step 307: The flow-level path management component 131 stores the received path of the primary network channel.

Specifically, after receiving the path of the primary network channel sent by the channel-level path management component 123, the flow-level path management component 131 may store the path of the primary network channel. For example, the path of the primary network channel may be represented by WiFi1.

FIG. 1C is a schematic diagram of an effect after the mobile phone uses the primary network channel. As shown in FIG. 1C, after obtaining the path of the primary network channel, the mobile phone may use the primary network channel to watch a video.

It can be understood that the current network application (for example, the video application shown in FIG. 1C) may include a plurality of flows (for example, a video flow and an audio flow). The plurality of flows may be carried on the primary network channel.

Step 308: The application-level policy management component 124 sends a traffic detection request to the traffic sensing component 133.

Specifically, the traffic detection request may be used to indicate the traffic sensing component 133 to start packet statistics of the network application on the primary network channel. The traffic detection request may include an identity (for example, a UID) of the network application currently to be detected, and is used to request to detect a flow that is of the network application corresponding to the identity UID and that is on the primary network channel. It can be understood that the flow of the network application may be in a form of a packet.

It should be noted that this step 308 may be performed at the same time as step 304, or may be performed at any time after step 304, which is not specially limited in this application.

Step 309: The traffic sensing component 133 sends a traffic reporting request to the traffic reporting component 141.

Specifically, after receiving the traffic detection request sent by the application-level policy management component 124, the traffic sensing component 133 may send the traffic reporting request to the traffic reporting component 141. The traffic reporting request may be used to indicate the traffic reporting component 141 to detect a packet of the network application on the primary network channel, and to report the detected packet. It can be understood that the traffic detection request may include the identity (for example, the UID) of the network application.

Step 310: The traffic reporting component 141 performs traffic detection, and reports a detected packet to the traffic sensing component 133.

Specifically, after receiving the traffic reporting request sent by the traffic sensing component 133, the traffic reporting component 141 may detect, based on the identity (for example, the UID) of the network application in the traffic reporting request, a packet of the network application corresponding to the identity of the network application. In this way, the packet of the network application on the primary network channel can be obtained, and the detected packet of the network application can be reported to the traffic sensing component 133.

During specific implementation, the traffic reporting component 141 may invoke a component (for example, a Netfilter component of the Android system) to obtain the packet of the network application on the primary network channel. It can be understood that the Netfilter component is merely an example for description, and does not constitute a limitation on the embodiments of this application, and in some embodiments, the packet may be detected by using another component.

For example, the parameter of the network channel may be implemented by using the following code:

```
typedef struct{
bool available;
bool slowDevForbbiden;
uint64_t qoeBadTimeStamp;
uint64_t chQoeBadStartTime;
uint32_t rcvRate;
}
```

It can be understood that the detected packet may be a packet of one or more feature flows in the current network application, and the feature flow may be a most sensitive flow in the network application, namely, a flow that has relatively large impact on the current network application. In addition, quality of the network channel may be assessed by using the foregoing parameter of the network channel.

Step 311: The traffic sensing component 133 collects statistics on the packet of the network application on the primary network channel, makes a prediction based on a statistical result to obtain a prediction result, and sends the prediction result to the flow-level path management component 131.

Specifically, after receiving the packet of the network application detected by the traffic reporting component 141, the traffic sensing component 133 may collect statistics on the packet, to obtain the packet statistics result. Then, analysis may be performed based on the packet statistics result, to predict a network status, that is, whether the network status will become better or poorer may be predicted based on the packet statistics result. During specific implementation, statistics on a packet loss rate and/or a delay of the packet of the network application may be collected, to predict the network status. For example, statistics on a loss rate and/or a delay of packets in preset N periods may be collected. If the packet loss rate or the delay or both obtained through statistics collection meet a preset requirement, it may be predicted that the network condition is good. If the packet loss rate or the delay does not meet or neither of them meets the preset requirement, it may be predicted that the network status is poor.

It can be understood that the quality of the network channel in this step 311 is a rough assessment, that is, statistics on packets of the feature flow in a relatively short period are collected, to quickly predict the network status. In this way, a secondary network channel can be selected in advance, thereby reducing a delay of channel switching.

The packet may be packets of various flows of the network application on the primary network channel. After receiving the packet, the traffic sensing component 133 may analyze the packet. The packet analysis may be based on a feature of the packet, to identify a feature flow. The Peacekeeper Elite game is used as an example. A feature flow of this game may be a voice flow. To be specific, the voice flow has relatively large impact on the game and has highest sensitivity. When quality of the voice flow is not good (for example, when neither of a delay and a packet loss rate meets a requirement), game experience of a user may be severely affected. Therefore, it is necessary to identify the voice flow, and further collect statistics on a voice flow packet in a packet. The packet of the voice flow may be identified through statistics on a heartbeat packet. The User Datagram Protocol (User Datagram Protocol, UDP) protocol is used as an example. A data packet feature of the voice flow may be represented by using the following features:

uplink: udp.payload[6]=0x64;

Downlink: udp.payload[6]=0x65.

FIG. 8 is a schematic diagram of a heartbeat packet of a voice flow of the UDP protocol.

To be specific, whether a packet is a data packet of a voice flow can be identified by reading a preset field in a payload of the uplink and downlink packets.

Then, statistics of the packet of the voice flow may be collected, to obtain a delay and/or a packet loss rate of the packet of the voice flow. During specific implementation, statistics on packets of the voice flow in preset duration may be collected. Preferably, the preset duration can be is, so that whether quality of the voice flow decreases can be determined as soon as possible, and further, the voice flow can be switched to a secondary network channel as soon as possible, so as to provide higher game experience. For example, if the delay and/or the packet loss rate of the packets of the voice flow cannot meet a requirement, it may be determined that the quality of the voice flow is poor. In this case, switching may be triggered, to switch the voice flow to the secondary network channel. It should be noted that the game is used as an example for description. In specific application, another network application may be further included, such as Baidu Netdisk. A feature flow of this network application is a download flow. To be specific, in the foregoing packet, a packet of a download flow may be found, and an influencing factor of the packet of the download flow may be a rate. In addition, the foregoing network application may further include a social network application such as WeChat. A feature flow of this network application is a video flow. To be specific, in the foregoing packet, a packet of a video flow may be found, and an influencing factor of the packet of the video flow may be a delay and/or a packet loss.

Figure 9:
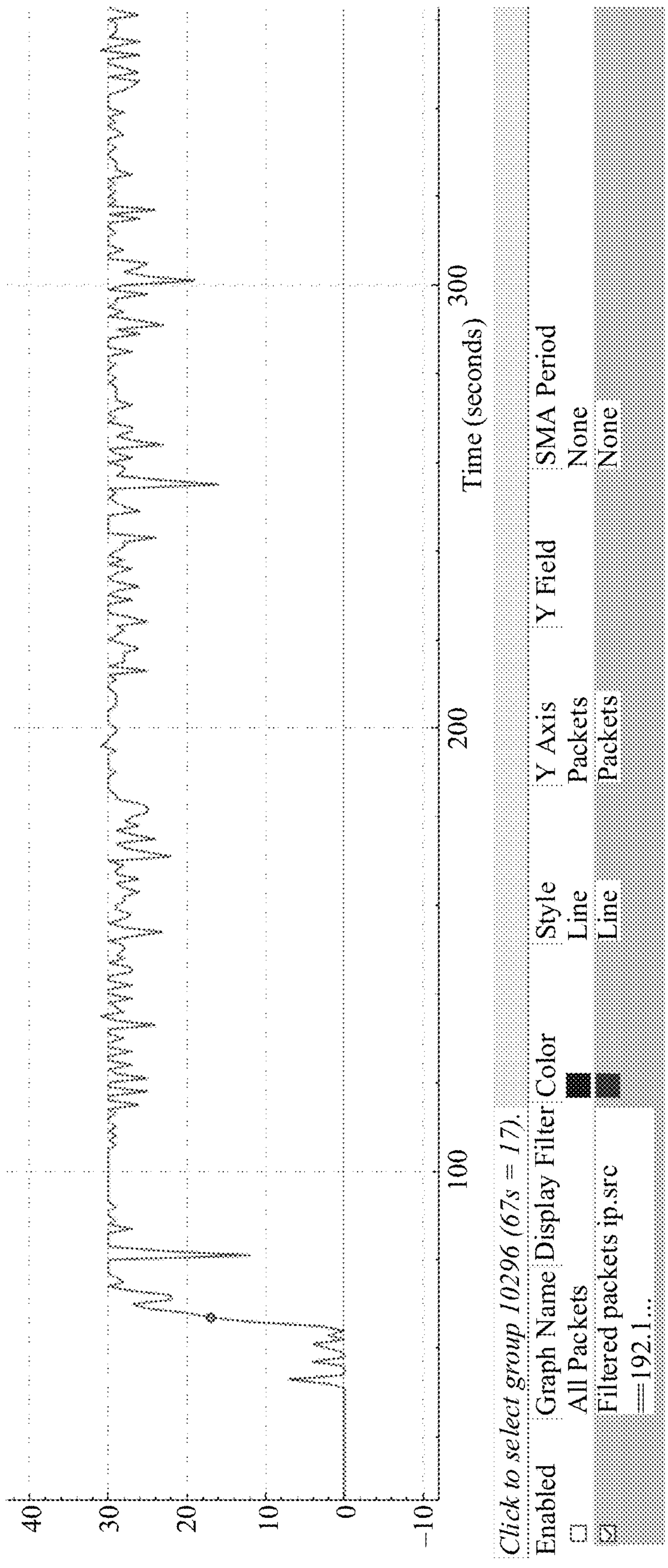
FIG. 9 is a schematic diagram of statistics on battle flow packets according to an embodiment of this application.

It can be understood that, in addition to the foregoing voice flow, the feature flow may further include a battle flow in a game. Peacekeeper Elite is used as an example. Whether a current packet flow is a battle flow may be determined by periodically counting a quantity of UDP packets. At present, a period used by Peacekeeper Elite is 500 ms. Therefore, whether the packet flow is a battle flow may be determined by counting a total quantity of packets in the period. For example, if the total quantity of packets in the 500-ms period is greater than 10, the packet flow is a battle flow. FIG. 9 is a schematic diagram of packet statistics of a battle flow of the UDP protocol. As shown in FIG. 9, a horizontal axis is time, and a vertical axis is a total quantity of packets.

Because the quantity of packets per second is basically kept at 30, it may be determined through calculation that there are 15 packets every 500 ms. Therefore, the packet flow may be determined as a battle flow.

Next, Arena of Valor is used as an example. For Arena of Valor, a battle packet is filtered by filtering a UDP protocol number and by using a packet header feature of payload=0x00010000. FIG. 10 is a schematic diagram of a heartbeat packet of a battle flow of the UDP protocol.

Step 312: The flow-level path management component 131 requests the secondary network channel from the channel-level path management component 123 based on the received prediction result.

Specifically, after receiving the prediction result, the flow-level path management component 131 may select the secondary network channel in advance based on the prediction result, for example, may send a secondary network channel request to the channel-level path management component 123 to request the secondary network channel.

Optionally, the secondary network channel request may carry a label, and the label may be used to indicate prediction of switching of the primary network channel, which is not real switching.

Figure 11A:
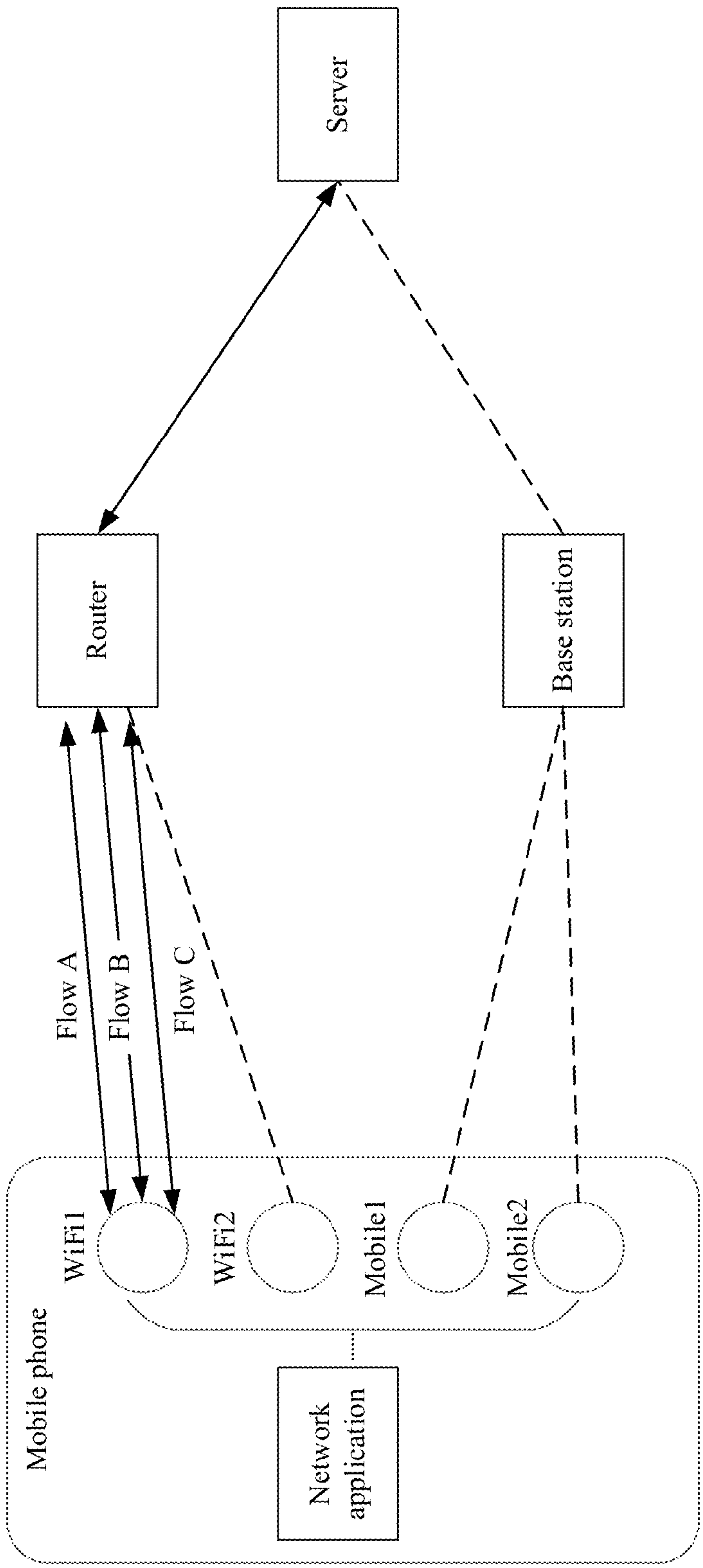
FIG. 11A to FIG. 11C are schematic diagrams of flow switching according to an embodiment of this application.
Figure 11B:
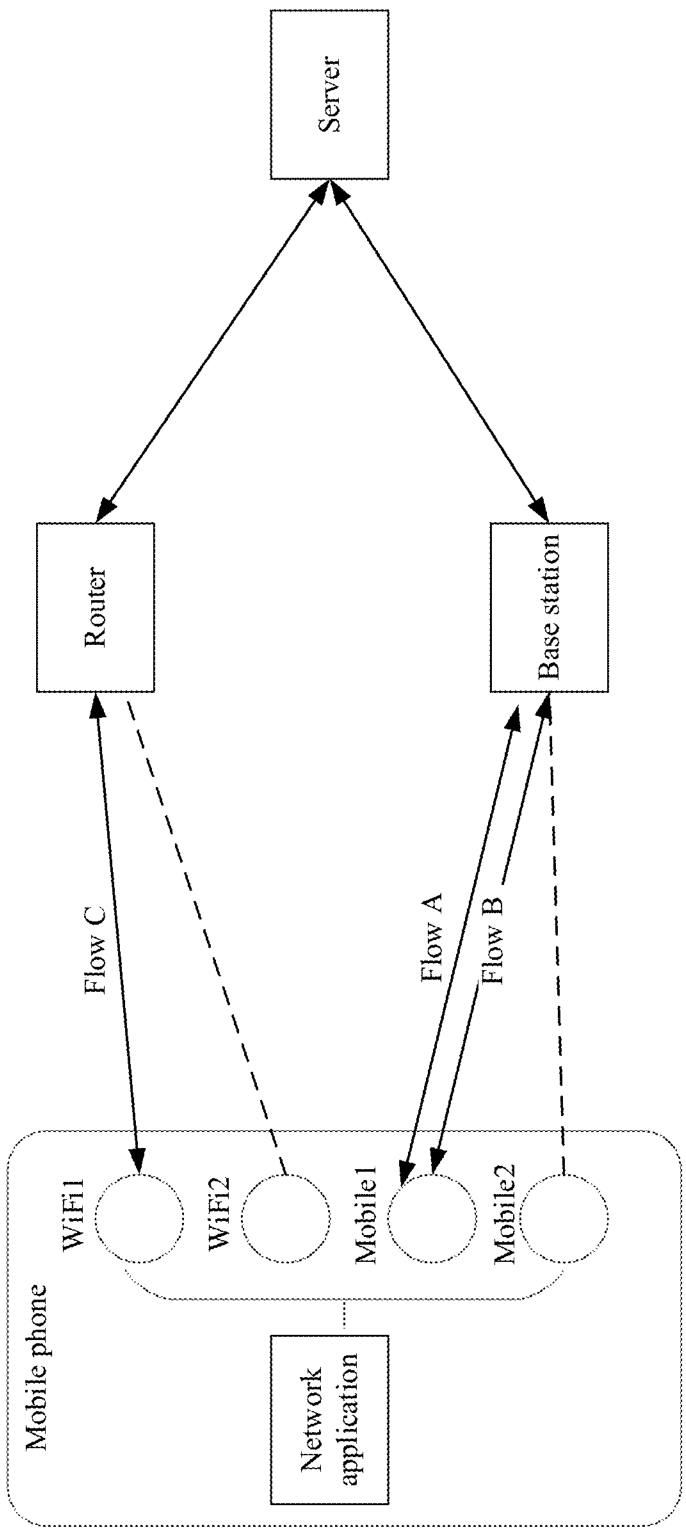
Figure 11C:
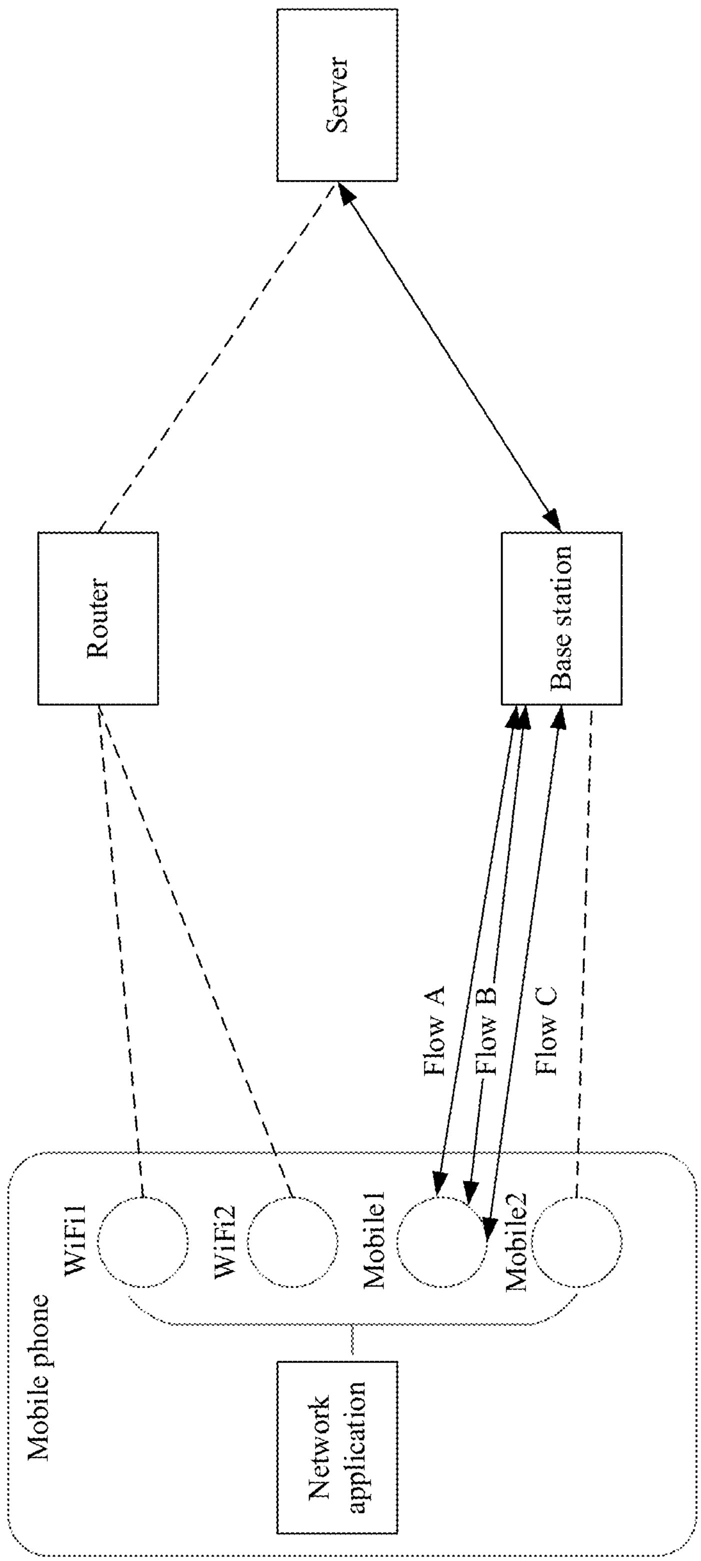

The following describes selection of the secondary network channel by using a mobile phone as an example with reference to FIG. 11A to FIG. 11C. As shown in FIG. 11A, the mobile phone has capabilities of four network channels, including a primary WiFi channel (for example, WiFi1), a secondary WiFi channel (for example, WiFi2), a primary cellular channel (for example, Mobile1), and a secondary cellular channel (for example, Mobile2). It is assumed that the mobile phone is currently running a network application (such as WeChat) on the WiFi1 channel (the primary network channel), and the network application includes a flow A (such as a video flow) and a flow B (such as an audio flow). When receiving the prediction result that the network is about to deteriorate, the mobile phone may select a secondary network channel in advance, where the secondary network channel may be a channel with best quality among the foregoing secondary WiFi channel (for example, WiFi2), primary cellular channel (for example, Mobile1), and secondary cellular channel (for example, Mobile2). After one network channel of the foregoing secondary WiFi channel (for example, WiFi2), primary cellular channel (for example, Mobile1), and secondary cellular channel (for example, Mobile2) is selected as the secondary network channel (for example, the Mobile1 channel), a path of the Mobile1 channel may be stored.

When finding through further packet detection that quality of the flow A does not meet the requirement, the mobile phone may switch only the flow A to the secondary network channel, namely, the Mobile1 channel. In this case, as shown in FIG. 11B, the flow B may be still carried on the primary network channel, namely, the WiFi channel, and the flow A may be carried on the secondary network channel, namely, the Mobile1 channel.

It should be noted that the foregoing example merely illustrates a scenario in which one flow is switched, and does not constitute a limitation on the embodiments of this application, and in some embodiments, a scenario in which a plurality of flows are switched may also be included.

Optionally, when finding through further packet detection that quality of the flow A does not meet the requirement, the mobile phone may switch both the flow A and the flow B to the secondary network channel, namely, the Mobile1 channel. In this case, as shown in FIG. 11C, both the flow A and the flow B are carried on the Mobile1 channel.

Figure 11D:
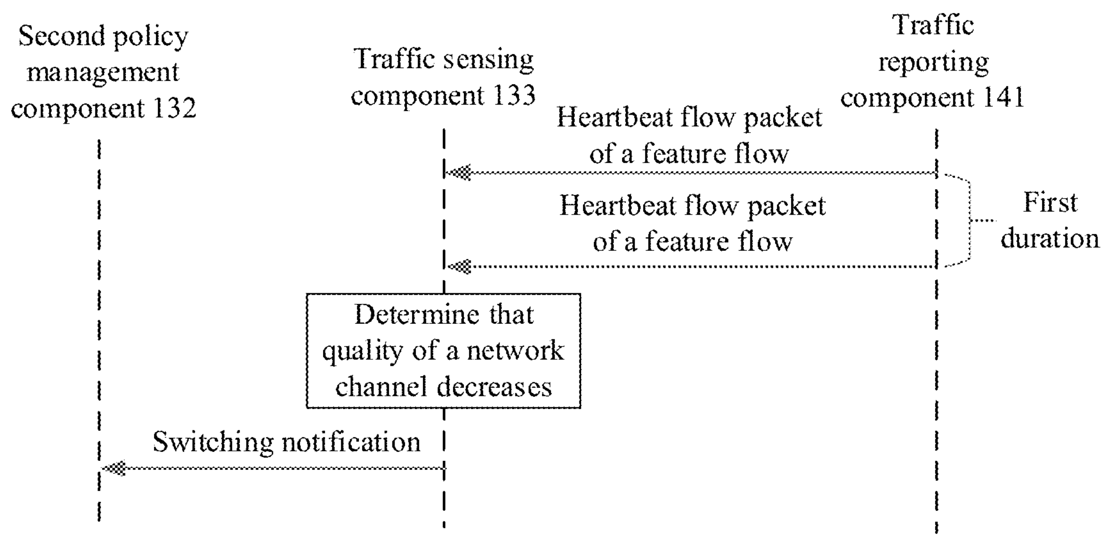
FIG. 11D is a schematic interactive flowchart of switching of a sensitive service according to an embodiment of this application.
Figure 11E:
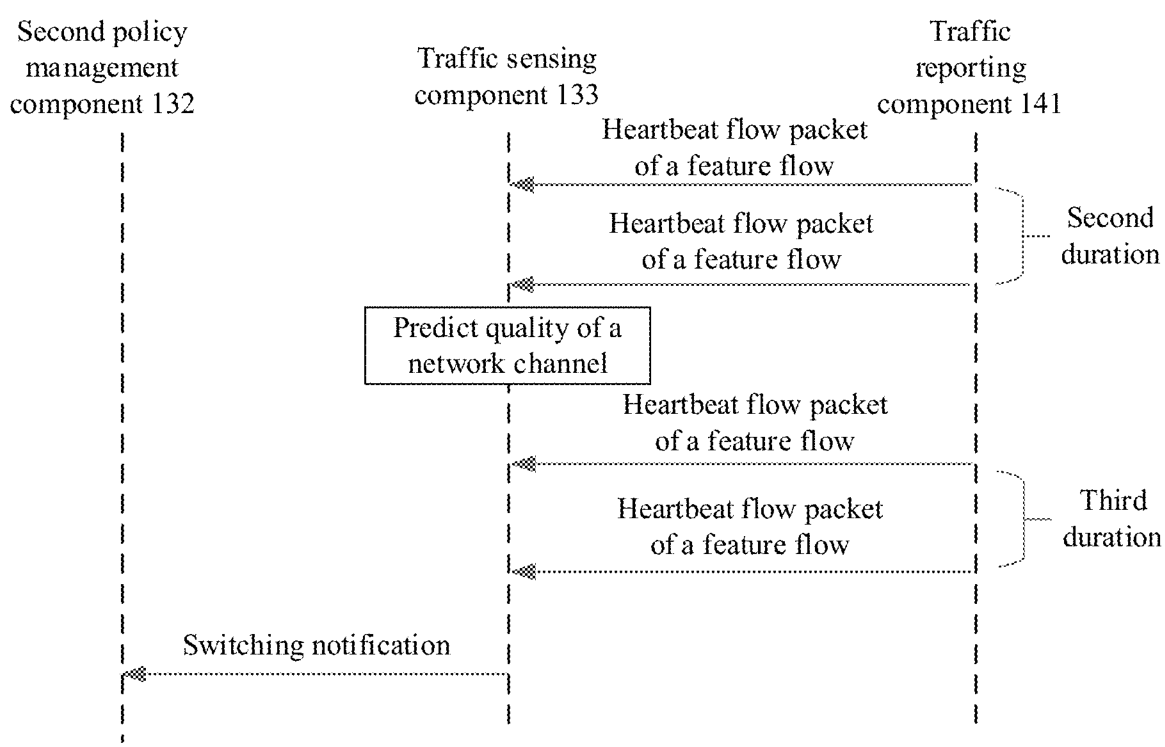
FIG. 11E is a schematic interactive flowchart of switching of a non-sensitive service according to an embodiment of this application.

Next, a condition for triggering channel switching is described by using a mobile phone as an example with reference to FIG. 11D and FIG. 11E. FIG. 11D shows a process of triggering channel switching for a non-sensitive service. As shown in FIG. 11D, the traffic sensing component 133 in the mobile phone receives, within preset first duration, heartbeat flow packets of a feature flow that are detected by the traffic reporting component 141, and performs statistical analysis on the heartbeat flow packets of the feature flow in the preset first duration to determine whether quality of the network channel decreases. Because the current service is a non-sensitive service, the preset first duration may be set to be longer, for example, 5s. When determining that the quality of the current network channel decreases, the traffic sensing component 133 may send a switching notification to the policy management component 132 to trigger network channel switching. For example, quality of other network channels may be assessed, and the current non-sensitive service may be switched to another network channel with best quality.

FIG. 11E shows a process of triggering channel switching for a sensitive service. As shown in FIG. 11E, the traffic sensing component 133 in the mobile phone receives, within preset second duration, heartbeat flow packets of a feature flow that are detected by the traffic reporting component 141, and performs statistical analysis on the heartbeat flow packets of the feature flow in the preset second duration to predict whether quality of the network channel decreases. The preset second duration may be set to be shorter, for example, is, so that the status of the network channel may be quickly predicted, and further, the secondary network channel may be quickly selected, so as to reduce a time for assessing the secondary network channel when real switching of the network channel is performed in the future. Then, the traffic sensing component 133 in the mobile phone continues to receive heartbeat flow packets of a feature flow that are detected by the traffic reporting component 141 within preset third duration, and performs statistical analysis on the heartbeat flow packets of the feature flow in the preset third duration to determine service quality of the feature flow in the current network application. The preset third duration may be equal to the preset first duration, for example, may be 5s, or may be shorter than the preset first duration, for example, may be 3s. When it is determined that the service quality of the feature flow decreases, a switching notification may be sent to the flow-level policy management component 132 to trigger network channel switching. For example, the feature flow of the current network application may be switched to the secondary network channel.

Step 313: The channel-level path management component 123 receives the secondary network channel request, to request an enabling status of each optional network channel.

Specifically, after receiving the secondary network channel request sent by the flow-level path management component 131, the channel-level path management component 123 may send a channel status request to the network detection component 122. The channel status request may be used to request to obtain the enabling status of each optional network channel. It can be understood that, the enabling status may include an available state and an unavailable state. The available state may be used to indicate that the optional network channel can be enabled, and the unavailable state may be used to indicate that the optional network channel is prohibited from being enabled. The optional network channel may include the secondary WiFi channel, the primary cellular channel, the secondary cellular channel, and the like.

Step 314: The network detection component 122 detects the enabling status of each optional network channel, and sends the enabling status of each optional network channel to the channel-level path management component 123.

Specifically, after receiving the channel status request sent by the channel-level path management component 123, the network detection component 122 may detect the enabling status of each optional network channel. During specific implementation, the network detection component 122 may be configured to manage enabling/disabling of each optional network channel. When any optional network channel is enabled, the optional network channel is in the available state. When any optional network channel is disabled, the optional network channel is in the unavailable state. Therefore, after detecting enabling statuses of all optional network channels requested by the channel-level path management component 123, the network detection component 122 may send the enabling statuses of all the optional network channels to the channel-level path management component 123.

Step 315: The channel-level path management component 123 requests channel quality of each available network channel.

Specifically, after receiving the enabling status of each optional network channel, the channel-level path management component 123 may select an available network channel (namely, an optional network channel in the available state), and may further send a channel assessment request to the channel and application quality assessment component 125. The channel assessment request may be used to request to assess quality of the available network channel.

Step 316: The channel and application quality assessment component 125 assesses quality of each available network channel, and sends an assessment result to the channel-level path management component 123.

Specifically, after receiving the channel assessment request sent by the first path management component 123, the channel and application quality assessment component 125 may assess the quality of each available network channel based on the channel assessment request. For example, the channel quality may include a delay, a packet loss rate, a bandwidth, and a rate of the channel. The assessment may be to assess a round-trip time (Round-Trip Time, RTT) of the available network channel, and a network channel with a smallest round-trip time is the best. Optionally, when the available network channel has a historical selection record, that is, the available network channel has been selected as a network channel, the channel quality may be assessed with reference to the RTT and a historical record. The historical record may include a historical reception rate, a quantity of historical times when the channel quality is poor, and the like. A manner of assessing the channel quality is not specially limited in this embodiment of this application. After the channel and application quality assessment component 125 completes quality assessment of all available network channels in the channel assessment request, the assessment result may be sent to the first path management component 123.

Step 317: The channel-level path management component 123 determines the secondary network channel based on the assessment result, and sends a path of the secondary network channel to the flow-level path management component 131.

Specifically, after receiving the assessment result, the channel-level path management component 123 may select the best available network channel as the secondary network channel based on the assessment result, and may send the path of the secondary network channel to the channel-level path management component 123.

Step 318: The flow-level path management component 131 receives and stores the path of the secondary network channel sent by the channel-level path management component 123.

Specifically, after receiving the path of the secondary network channel sent by the channel-level path management component 123, the flow-level path management component 131 may prestore the path of the secondary network channel. It can be understood that the network status is only predicted in step 312, that is, a current network is poor, which may cause a stuck service, but the switching condition is not reached yet. Therefore, in this case, the first device does not switch to the secondary network channel, that is, the first device still uses the primary network channel.

For example, after receiving, at a time t1, the path of the secondary network channel sent by the channel-level path management component 123, the flow-level path management component 131 may prestore the path of the secondary network channel. In this case, the first device does not switch to the secondary network channel, that is, the first device still uses the primary network channel. Then, when it is detected at a time t2 that quality of a feature flow of the current network application decreases and the switching condition has been reached, the first device may switch the feature flow from the primary network channel to the secondary network channel.

Step 319: The traffic reporting component 141 reports a packet to the traffic sensing component 133.

Specifically, the traffic reporting component 141 may continuously detect packets of the current primary network channel, and report the detected packet to the traffic sensing component 133.

Step 320: The traffic sensing component 133 receives the packet reported by the traffic reporting component 141, analyzes the packet to obtain a packet analysis result, and sends the packet analysis result to the flow-level policy management component 132.

Specifically, after receiving the packet reported by the traffic reporting component 141, the traffic sensing component 133 may identify a feature flow from the packet. For a manner of identifying a feature flow, refer to step 311. Details are not described herein again. Then, a packet in the feature flow may be analyzed to obtain a packet analysis result. The packet analysis result may be used to represent whether the feature flow meets a service requirement, for example, whether the feature flow meets a delay requirement or meets a packet loss rate requirement. In addition, the packet analysis result may be sent to the flow-level policy management component 132.

It can be understood that this step 320 is different from the rough quality assessment of the network channel in step 311, in which received packets of the feature flow are analyzed in a relatively short period to obtain the network quality and make a prediction for switching. In this step 320, received packets of the feature flow are analyzed in a relatively long period to determine whether to perform real switching. In other words, step 320 is fine-grained quality assessment, to implement feature flow-specific network channel switching, so as to reduce a delay.

In the prior art, for a parameter (for example, a delay or a packet loss rate) used for network quality assessment, only a threshold is set for the parameter, and an assessment policy corresponding to the threshold is used to assess the network quality. In the method provided in this embodiment of this application, at least two thresholds with different values may be set for a parameter, each threshold corresponds to an assessment policy, and a larger threshold indicates a smaller delay of an assessment policy. For example, if a threshold 1 and a threshold 2 are set for the delay and the threshold 2 is greater than the threshold 1, an assessment policy corresponding to the threshold 1 may be: if the delay is greater than the threshold 1 for three periods of five consecutive periods, the packet analysis result is poor quality, or otherwise, the packet analysis result is good quality; and an assessment policy corresponding to the threshold 2 may be: if the delay is greater than the threshold 2 for one period, the packet analysis result is poor quality, or otherwise, the packet analysis result is good quality. Based on the foregoing assessment policy, it can be learned that the delay of the assessment policy corresponding to the threshold 1 is three periods, and the delay of the assessment policy corresponding to the threshold 2 is one period.

For Example:

The feature flow is a voice flow, and the packet reported by the traffic reporting component is a heartbeat flow packet in the voice flow. Quality of the network channel is assessed by using an RTT of the heartbeat flow packet, a threshold 1 and a threshold 2 are preset for the RTT of the heartbeat flow packet, and assessment policies corresponding to the thresholds are the same as those of the foregoing example.

The traffic sensing component 133 determines whether an RTT of the current period is greater than the threshold 2;

- if the RTT of the current period is greater than the threshold 2, determines that the packet analysis result of the voice flow is poor quality, and sends the packet analysis result of the voice flow to the flow-level policy management component 132; or
- if the RTT of the current period is not greater than the threshold 2, the traffic sensing component 133 determines whether the RTT is greater than the threshold 1 for three periods in a window in which the current period is located, where the window in which the current period is located includes five consecutive periods with the current cycle used as the end period; and
- if the RTT is greater than the threshold 1 for three periods in the window, determines that the packet analysis result of the voice flow is poor quality, and sends the packet analysis result of the voice flow to the flow-level policy management component 132; or if the RTT is not greater than the threshold 1 for three periods in the window, determines that the packet analysis result of the voice flow is good quality, and sends the packet analysis result of the voice flow to the flow-level policy management component 132.

Optionally, the traffic sensing component 133 may send the packet analysis result of the voice flow to the flow-level policy management component 132 only when the packet analysis result of the voice flow is poor quality.

It should be noted that, in the foregoing description, that two thresholds are preset for the parameter is used as an example, and the thresholds may also be increased to three or more preset thresholds. This is not limited in this embodiment of this application.

Step 321: The flow-level policy management component 132 determines to perform switching based on the packet analysis result, and requests to obtain the path of the secondary network channel.

Specifically, after receiving the packet analysis result reported by the traffic sensing component 133, the flow-level policy management component 132 may determine whether to perform channel switching based on the packet analysis result. During specific implementation, if a current feature flow of the network application (for example, a voice flow in a game, a video flow in WeChat, or a download flow of Baidu Netdisk) does not meet a requirement (for example, a delay and/or a packet loss rate), it may be determined that channel switching needs to be performed. In this case, the flow-level policy management component 132 may send a secondary network channel path obtaining request to the flow-level path management component 131, to obtain the path of the secondary network channel. For example, if the secondary network channel is the primary cellular channel, the path of the secondary network channel may be, for example, Mobile1.

For example, the foregoing requesting the path of the secondary network channel may be implemented by using the following code:

```
  private boolean requestNetwork( ){
Log.i(TAG, "requestNetwork, pathId="+mChannelId+"slotId="+mSlotId+"mSubId")
    If(mConnectivityManager == NULL{
      Log.e(TAG, "requestNetwork, mConnectivityManager is NULL");
      return false;
    }
    If(!Utils.is ValidSub Id(mSubId)){
      Log.e(TAG, "requestNetwork, invalid subId: "+mSubId);
      return false;
    }
    NetworkRequest.Builder builder=new NetworkRequest.Builder( );
    builder.addCapability(NetworkCapabilities.NET_CAPABILITY_INTERNET);
    builder.addTransportType(NetworkCapabilities. Transport_CELLULAR);
    builder.remove
Capability(NetworkCapabilities.NET_CAPABILITY_NOT_RESTRICTED);
    builder.setNetworkSpecifier(String.valueOf(mSubId));
    NetworkRequest build=builder.build( );
    mConnectivityManager.requestNetwork(build,                this,
(int)GET_PATH_RESPONSE_TIMER_MS);
    return true;
  }
```

In addition, during specific implementation, the path of the network channel (for example, the path can be represented by using a device number of a network adapter or a SIM card) may be defined in a data structure, and a code example is as follows:

```
struct sock{
  struct sock_common        _sk_common
#define    sk_node      _sk_common.skc_node
#define    sk_nulls_node      _sk_common.skc_nulls_node
#define    sk_refcnt     _sk_common.skc_crefcnt
#define    sk_tx_queue_mapping     _sk_common.skc_tx_queue_mapping
#define    sk_dontcopy_begin     _sk_common.skc_dontcopy_begin
#define    sk_dontcopy_end     _sk_common.skc_dontcopy_end
#define    sk_hash      _sk_common.skc_hash
#define    sk_portpair      _sk_common.skc_portpair
#define    sk_num      _sk_common.skc_num
#define    sk_dport     _sk_common.skc_dport
#define    sk_addrpair     _sk_common.skc_addrpair
#define    sk_daddr     _sk_common.skc_daddr
#define    sk_rcv_saddr     _sk_common.skc_saddr
#define    sk_family     _sk_common.skc_family
#define    sk_state     _sk_common.skc_state
#define    sk_reuse     _sk_common.skc_reuse
#define    sk_reuseport     _sk_common.skc_reuseport
#define    sk_ipv6only     _sk_common.skc_ipv6only
#define    sk_net_refcnt     _sk_common.skc_net_refcnt
#define    sk_bound_dev_if     _sk_common.skc_bound_dev_if
#define    sk_bind_node     _sk_common.skc_bind_node
#define    sk_prot     _sk_common.skc_prot
#define    sk_net     _sk_common.skc_net
#define    sk_v6_daddr     _sk_common.skc_v6_daddr
#define    sk_v6_rcv_saddr     _sk_common.skc_v6_rcv_saddr
#define    sk_cookie     _sk_common.skc_cookie
#define    sk_incoming_cpu     _sk_common.skc_incoming_cpu
#define    sk_flags     _sk_common.skc_net_flags
#define    sk_rxhash     _sk_common.skc_rxhash
#ifdef CONFIG_HW_DPIMARK_MODULE
#define    sk_hwdpi_mark     _sk_common.skc_hwdpi_mark
}
```

As shown in the foregoing code, sk_bound_dev_if is a device number of a switched-to target network adapter or target SIM card. It can be understood that a packet may be received through the network adapter or the SIM card, and for code for receiving the packet, reference may be made to the following example:

Pktinfo.msg.flow_msg.dev_if=sk→sk_bound_dev_if;

where pktinfo is the received packet, and msg.flow_msg is a name of a packet flow.

It can be understood that, if it is determined through packet analysis that the current feature flow of the network application meets the requirement, that is, no switching is required, the first device may delete the path of the secondary network channel, to release a resource and in addition, to reduce power consumption of the first device. Optionally, the first device may alternatively delete the path of the secondary network channel after preset duration (for example, preset fourth duration), to ensure that if the quality of the feature flow decreases within the preset fourth duration, the feature flow may be switched to the secondary network channel in time, so as to avoid a switching failure caused due to deletion of the path of the secondary standby network channel.

Step 322: The flow-level path management component 131 sends the path of the secondary network channel to the flow-level policy management component 132.

Step 323: The flow-level policy management component 132 sends a channel switching indication to the policy enforcement component 142.

Specifically, after receiving the path of the secondary network channel sent by the flow-level path management component 131, the flow-level policy management component 132 may send the channel switching indication to the policy enforcement component 142. The channel switching indication may be used to indicate the policy enforcement component 142 to switch the feature flow from the current primary network channel to the secondary network channel, so as to complete channel switching faster, and reduce a delay caused by channel switching, thereby improving user experience.

Step 324: The policy enforcement component 142 performs channel switching.

Specifically, after receiving the channel switching indication sent by the flow-level policy management component 132, the policy enforcement component 142 may switch the feature flow from the current primary network channel to the secondary network channel. To be specific, other flows of the network application may be still carried on the primary network channel for running, and the feature flow may be carried on the secondary network channel for running, so as to complete switching faster, thereby ensuring service quality and user experience.

Optionally, the entire network application may be switched to the secondary network channel, that is, the primary network channel may be disabled, and all flows of the network application are carried on the secondary network channel for running.

FIG. 1D is a schematic diagram when the mobile phone uses the secondary network channel. As shown in FIG. 1D, after receiving the channel switching indication, the mobile phone may switch the video the current primary network channel to the secondary network channel, and use the secondary network channel to watch the video, so as to avoid the video from being stuck.

Figure 12:
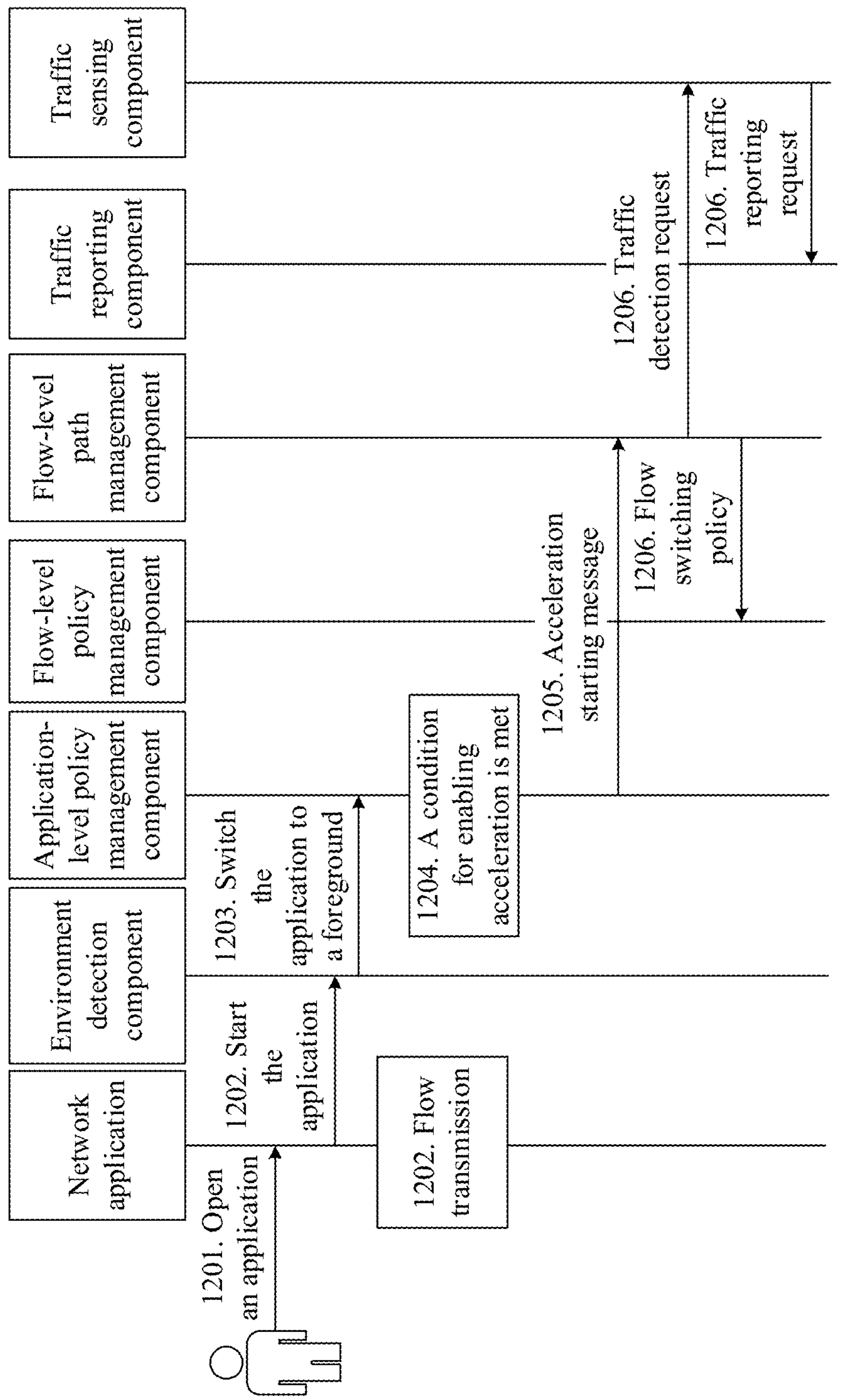
FIG. 12 is a time sequence diagram of interaction between components of an electronic device according to an embodiment of this application.
Figure 13A:
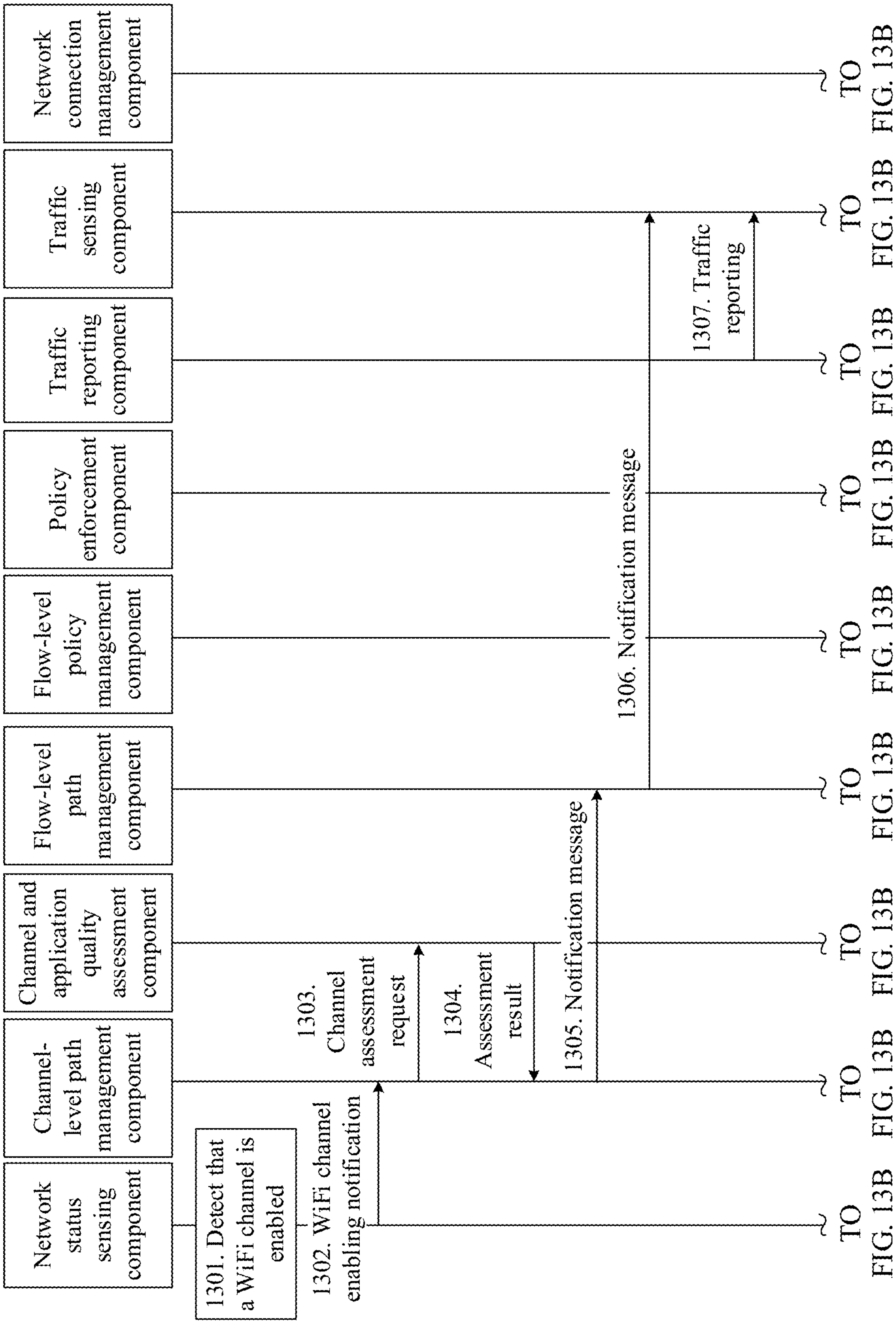
FIG. 13A, FIG. 13B, and FIG. 13C are another time sequence diagram of interaction between components of an electronic device according to an embodiment of this application.
Figure 13B:
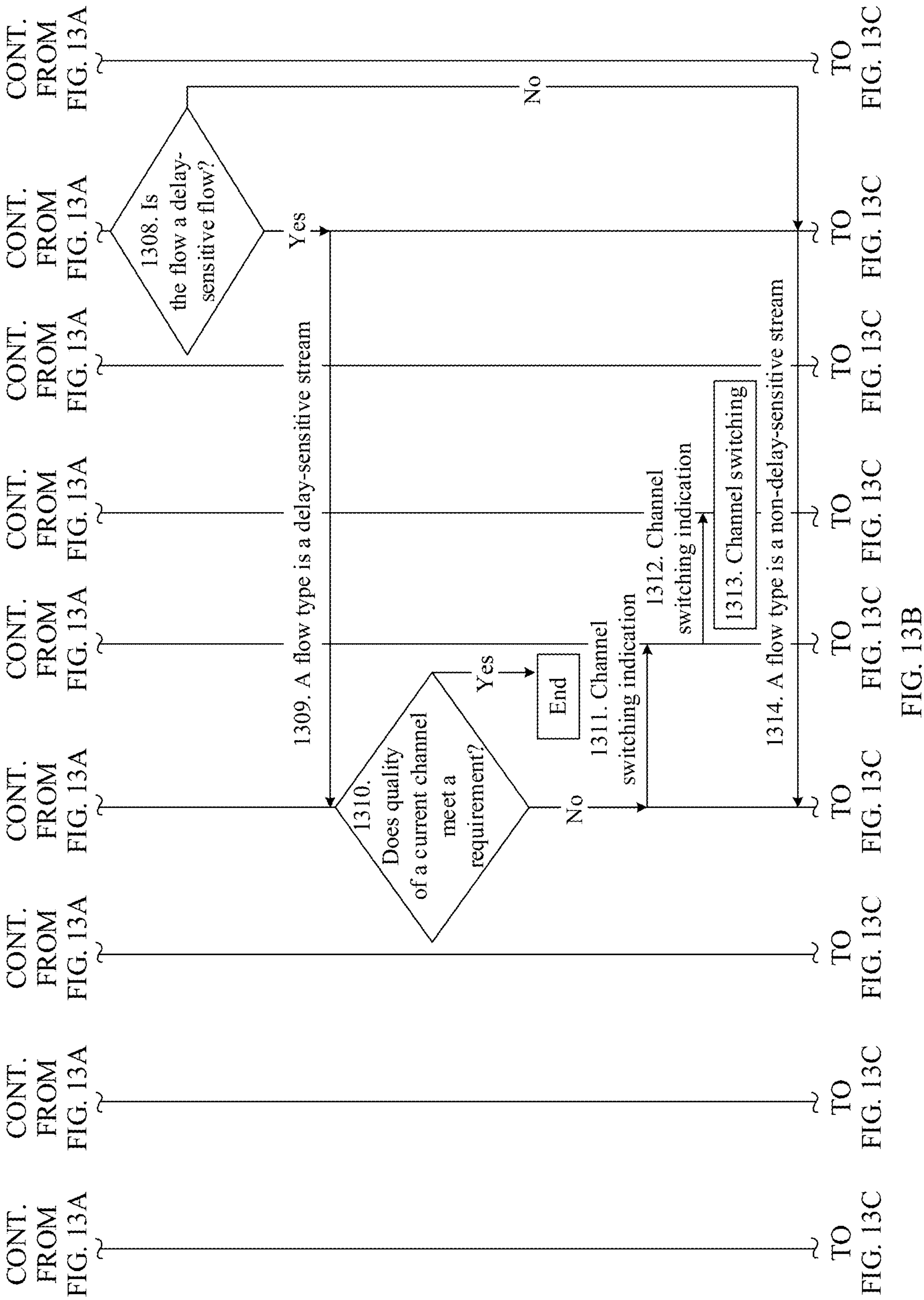
Figure 13C:
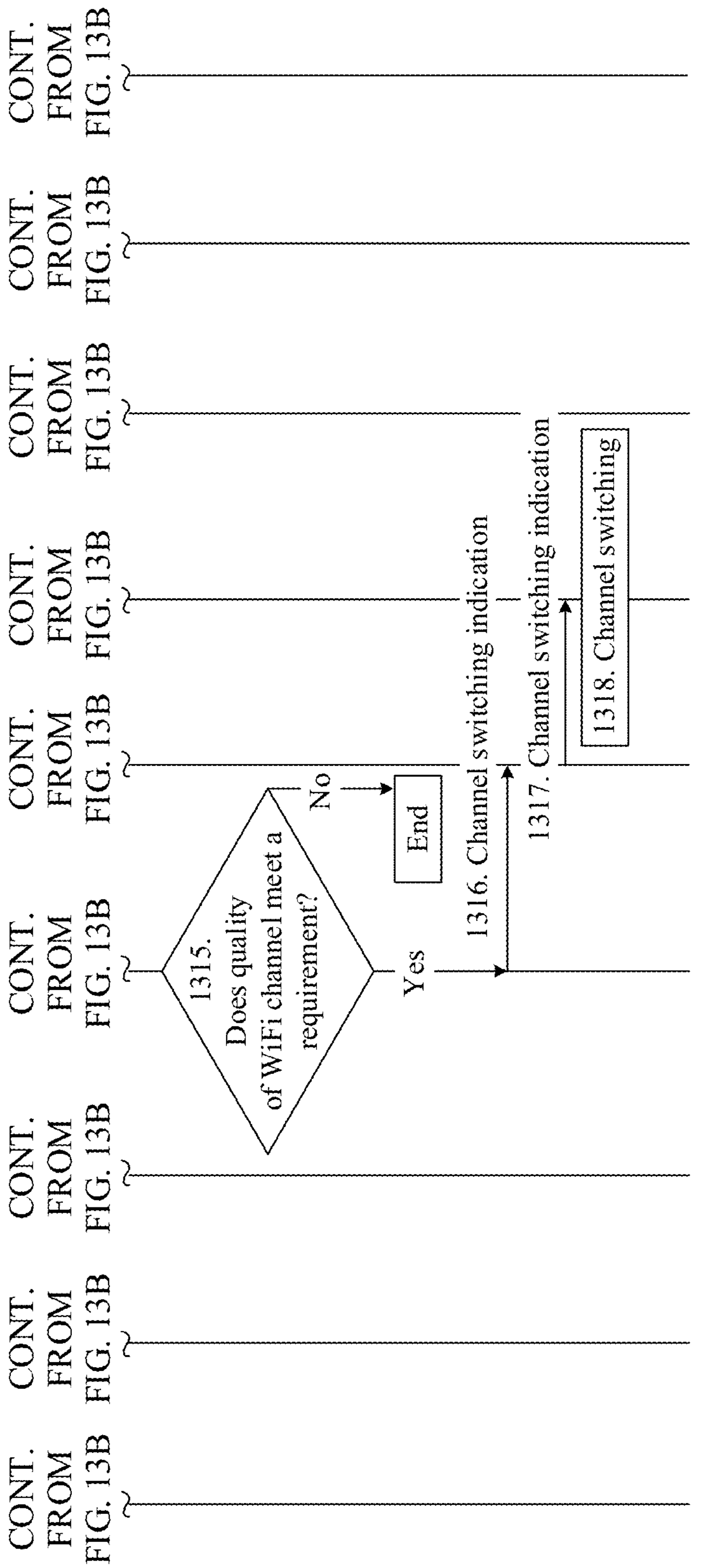
Figure 14:
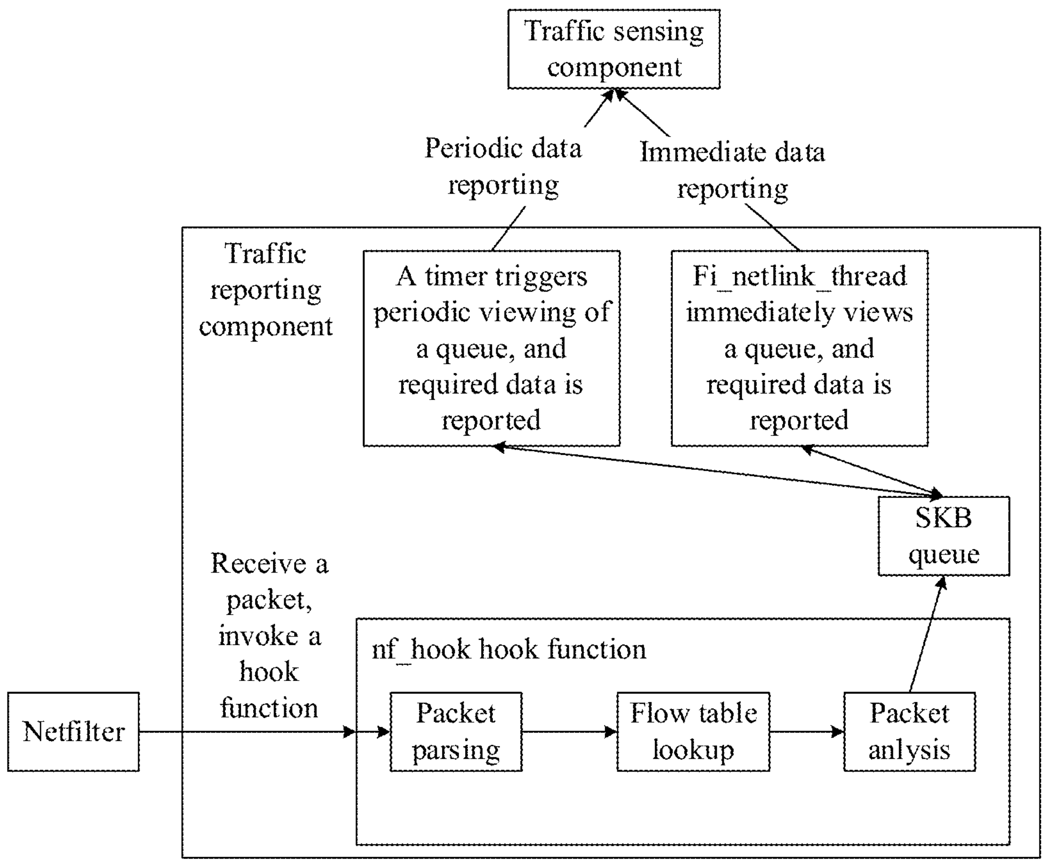
FIG. 14 is a schematic diagram of an implementation principle of a traffic reporting component according to an embodiment of this application.

The following describes the channel switching method in this embodiment of this application in detail with reference to the system block diagram of the first device shown in FIG. 5 by using time sequence diagrams, shown in FIG. 12 to FIG. 14, of components in the first device.

FIG. 12 is a time sequence diagram of interaction between components in the first device according to an embodiment of this application. As shown in FIG. 12, the method may include the following steps.

Step 1201: Start a network application in response to an operation of a user.

For implementation of this step, refer to step 301. Details are not described herein again.

Step 1202: Perform flow transmission between the network application and a server.

The user selects a service of the network application, and the network application performs, based on the service, transmission of a flow required by the service between the network application and the server. The network application may use a network channel (for example, a primary network channel) to perform flow transmission with the server. For example, the network application is a video application, and the user chooses to play a video. Flows required by the service may include a video flow and an audio flow, and the video flow and the audio flow may be carried on the primary network channel. Correspondingly, the mobile phone may use the primary network channel to interact with the server, so as to obtain the video flow and the audio flow from the server and play the video.

It should be noted that this embodiment of this application focuses on how to switch the network channel after the network application starts to use the primary network channel to interact with the server. How to use the primary network channel to start to interact with the server after the network application initializes and starts is not limited in this embodiment of this application.

Step 1203: The environment detection component 121 detects that the network application is switched to a foreground, and notifies the application-level policy management component 124.

For implementation of this step, refer to the description of step 302. Details are not described herein again.

Step 1204: The application-level policy management component 124 determines whether the network application meets a condition for enabling acceleration.

For implementation of this step, refer to the description of step 303. Details are not described herein again.

Implementation of a network application whitelist is further described.

In this embodiment of this application, for example, data of the network application is divided into flows according to types. One type corresponds to one flow of the network application. As shown in the following Table 3, in addition to a network application needing to be accelerated, the network application whitelist may further record:

- a type of a target flow needing to be monitored in each network application, for example, as shown in the field of "Type of target flow" in Table 3;
- a flow model corresponding to each type of target flow, for example, as shown in a flow model field in the following Table 3;
- a network quality assessment parameter used to assess network quality of the target flow, for example, as shown in the "Channel quality parameter" field in the following Table 3; and
- a policy for performing channel switching on the flow of the network application after an assessed decrease in network quality of the target flow, briefly referred to as a flow switching policy below, for example, as shown in the "Flow switching policy" field in the following Table 3.

with the target flow may be a flow that is sensitive to a same network assessment parameter as the target flow. For example, if the target flow is a flow sensitive to a delay (briefly referred to as a delay-sensitive flow below), the flow in the flow switching policy is some or all of delay-sensitive flows including the target flow in the network application; if the target flow is a flow sensitive to a packet loss rate (briefly referred to as a packet loss rate-sensitive flow), the flow in the flow switching policy is some or all of packet loss rate-sensitive flows including the target flow in the network application. In this way, the network quality of the target flow decreases, and network channel switching is performed for a type of flows sensitive to a same network assessment parameter in the network application.

Optionally, the flow model corresponding to the target flow type is used to record feature information of a packet needing to be monitored in the target flow. For example, the feature information may be at least one of the following feature information: a 4-tuple, a 5-tuple, a protocol number, a string in a payload, and the like.

It should be noted that, in the flow switching policy in the embodiment of this application, when quality of a specific flow of the network application decreases, network channel switching may be performed for a plurality of flows of the network application on a same network channel, including the flow, so as to switch the plurality of flows from the current network channel to another network channel with better quality, thereby preventing the service of the network application from being stuck. For example, in Table 3, if the video flow of WeChat becomes poor, and the video flow and the voice flow of WeChat are on a same network channel, network channel switching is performed for both the video flow and the voice flow of WeChat, so as to switch the video flow and the voice flow from the current network channel to a network channel with better quality, thereby reducing a possibility of a problem of stuck video and voice play of WeChat.

TABLE 3

| Application name | Target flow type | Flow model of feature flow | Channel quality parameter | Flow switching policy |
|---|---|---|---|---|
| Baidu Netdisk | Video download flow | 4-tuple 1 | Rate | Video download flow and voice download flow |
| WeChat | Video flow | 4-tuple 2 | Delay/packet loss | Video flow and voice flow |
| Game | Game battle flow | 4-tuple 3 | Delay/packet loss | Game battle flow and voice flow |

Optionally, the target flow may be a flow that can be quickly reflected in terms of one or some specific network quality assessment parameters when quality of a network channel carrying the target flow decreases, for example, may be one or more feature flows of the network application.

Optionally, the network quality assessment parameter of the target flow may be a parameter that can quickly reflect the decrease in network quality of the target flow.

The flow switching policy records a flow that requires network channel switching together with the target flow. Optionally, the flow recorded in the flow switching policy is generally a flow that has relatively large impact on service processing in the network application, for example, the foregoing described feature flow of the network application such as the video flow and the audio flow in the video play application or the game battle flow and the voice flow in the game application.

Optionally, the flow that is recorded in the flow switching policy and that requires network channel switching together Step 1205: The application-level policy management component 124 sends an acceleration starting message to the flow-level path management component 131.

Specifically, if the application-level policy management component 124 determines that the current network application meets the condition for enabling acceleration, it may start an acceleration service for the network application, and send the acceleration starting message to the flow-level path management component 131. The acceleration starting message is used to indicate, to the flow-level path management component 131, that the acceleration service can be started for the network application.

The acceleration service may include but is not limited to:

when an environment of the electronic device or a system environment of the electronic device changes, a secondary network channel is enabled, so that the secondary network channel changes from a sleep state to an awake state; and/or network quality of a plurality of flows in the network application is monitored, and when monitoring that quality of a flow of the network application decreases, the electronic device switches the plurality of flows of the network application, including the flow whose quality decreases, to the secondary network channel, so that the plurality of flows of the network application are always carried on a network channel with better quality, so as to ensure transmission quality of the flow, and reduce a possibility of stuck service running of the network application, thereby improving user experience. It should be noted that, if the electronic device has enabled the secondary network channel when deciding to switch the plurality of flows to the secondary network channel, it switches the multiple flows to the already enabled secondary network channel. If the electronic device has not enabled the secondary network channel when deciding to switch the plurality of flows to the secondary network channel, the electronic device needs to first enable the secondary network channel, and then switch to the enabled secondary network channel.

Optionally, the acceleration starting message may include information corresponding to an identity of the current network application in the network application whitelist, for example, may include: the identity of the current network application, a target flow type, a flow model corresponding to the target flow type, and network quality assessment parameter information, and flow switching policy information. For details, refer to the foregoing related description. Details are not described herein again.

Optionally, the flow-level path management component 131 may store the path of the currently used network channel, where the path is a path of the network channel used by the network application. Alternatively, if the flow-level path management component 131 does not store the path of the currently used network channel, that is, the path of the network channel used by the network application is not stored in the flow-level path management component 131, the flow-level path management component 131 may request, from the channel-level path management component 123, the path of the network channel used by the network application. The channel-level path management component 123 may send the path of the network channel used by the network application to the flow-level path management component 131.

Step 1206: The flow-level path management component 131 sends an identity of the network application and flow switching policy information to the flow-level policy management component 132, and sends a traffic detection request to the traffic sensing component 133, and the traffic sensing component 133 sends a traffic reporting request to the traffic reporting component.

Optionally, the traffic detection request may include a first configuration file for the network application, where the first configuration file may include: the identity of the network application, the target flow type, the flow model corresponding to the target flow type, the network quality assessment parameter information, and the like.

Optionally, the traffic reporting request may include a second configuration file for the network application, where the second configuration file may include: the identity of the network application, the target flow type, and the flow model corresponding to the target flow type.

It should be noted that the purpose of this step is to initialize various related information for the current network application to the flow-level policy management component 132, the traffic sensing component 133, and the traffic reporting component 141. Therefore, in another possible implementation, the flow-level path management component 131 may also directly send the second configuration file for the network application to the traffic reporting component 141, which is not limited herein.

Through processing of this step, the traffic reporting component may be triggered to start monitoring the flow in the network application, so as to trigger a subsequent flow-specific network channel switching process.

The following describes a channel switching process of the flow of the current application of the electronic device with reference to FIG. 13A, FIG. 13B, and FIG. 13C.

FIG. 13A, FIG. 13B, and FIG. 13C are another time sequence diagram of interaction between components in the first device according to another an embodiment of this application. As shown in FIG. 13A, FIG. 13B, and FIG. 13C, the method may include the following steps.

Step 1301: A network status sensing component 122 detects that a WiFi channel is enabled.

The first device enters a coverage area of the WiFi network, successfully logs in to WiFi by using historical login data, and enables the WiFi channel, and a status of the WiFi channel changes from a sleep state to an awake state. The network status sensing component 122 monitors that the status of the WiFi channel changes from the sleep state to the awake state, to detect that the WiFi channel is enabled.

Step 1302: The network status sensing component 122 sends a WiFi channel enabling notification message to the channel-level path management component 123.

After detecting that the WiFi channel is enabled, the network status sensing component 122 sends the WiFi channel enabling notification message to the channel-level path management component 123. The notification message may include identification information of the WiFi channel and status information (such as the awake state).

Step 1303: The channel-level path management component 123 sends a channel assessment request to the channel and application quality assessment component 125.

The channel quality assessment request is used to request the channel and quality assessment component 125 to assess quality of the newly enabled WiFi channel and quality of a currently used cellular channel.

Step 1304: The channel and application quality assessment component 125 assesses quality of the WiFi channel and the cellular channel, and sends an assessment result to the channel-level path management component 123.

Specifically, after receiving the channel assessment request sent by the channel-level path management component 123, the channel and application quality assessment component 125 may assess the quality of the WiFi channel and the cellular channel based on the channel assessment request.

For example, the quality of the network channel may be assessed based on at least one of the following parameters of the network channel: a delay, a packet loss rate, a bandwidth, a rate, and the like of the channel. For example, the quality assessment may be to assess a round-trip time (Round-Trip Time, RTT) of an available network channel, and a network channel with a smallest round-trip time is the best.

Optionally, when the WiFi channel or the cellular channel or both have a historical selection record, that is, the WiFi channel or the cellular channel or both have been selected as a network channel, the channel quality of the WiFi channel and the cellular channel may be assessed with reference to the RTT and a historical record. The historical record may include a historical reception rate, a quantity of historical times when the channel quality is poor, and the like. A manner of assessing the channel quality is not specially limited in this embodiment of this application.

After the channel and application quality assessment component 125 completes quality assessment of all available network channels in the channel assessment request, the assessment result may be sent to the channel-level path management component 123.

For implementation of this step, refer to corresponding description of step 316. Details are not correspond described herein again.

Step 1305: The channel-level path management component 123 sends a notification message to the flow-level path management component 131.

The notification message is used to notify the flow-level path management component 131 that the WiFi channel has been enabled. The notification message may include: identification information of the WiFi channel, a channel quality assessment result of the WiFi channel, and a channel quality assessment result of the currently used cellular channel.

Step 1306: The flow-level path management component 131 sends a notification message to the traffic sensing component.

The notification message is used to indicate the traffic sensing component to detect whether a packet is a delay-sensitive flow.

The delay-sensitive flow means that the flow is sensitive to a delay, that is, a change in the delay has relatively large impact on a service using the flow.

Step 1307: The traffic reporting component 141 performs traffic detection, and reports a detected packet to the traffic sensing component 133.

Specifically, based on the foregoing step 1206, after receiving the traffic reporting request, the traffic reporting component 141 may detect a packet of a target flow of the network application based on the traffic reporting request, and report a detection result to the traffic sensing component 133. The detection result may include: the packet of the target flow, or the packet of the target flow and packet statistics information of the target flow, or the like.

During specific implementation, the traffic reporting component 141 may invoke a component (for example, a Netfilter component of the Android system) to obtain the packet of the target flow of the network application on the current network channel (for example, the primary network channel). It can be understood that the Netfilter component is merely an example for description, and does not constitute a limitation on the embodiments of this application, and in some embodiments, the packet may be detected by using another component.

For example, the parameter of the network channel may be implemented by using the following code:

```
typedef struct{
bool available;
bool slowDevForbbiden;
uint64_t qoeBadTimeStamp;
uint64_t chQoeBadStartTime;
uint32_t rcvRate;
}
```

It can be understood that the detected packet may be a packet of one or more feature flows in the current network application, and the feature flow may be a most sensitive flow in the network application, namely, a flow that has relatively large impact on the current network application. In addition, quality of the network channel may be assessed by using the foregoing parameter of the network channel.

Optionally, when performing traffic detection, the traffic reporting component 141 may register a hook function in a kernel Netfilter framework to obtain the packet of the target flow. An overall implementation block diagram is shown in FIG. 14. The Netfilter hooks a packet to a nf_hook hook function of the traffic reporting component. A packet carried on the current network channel enters the traffic reporting component 141. After performing processes such as packet parsing, flow table creation, and packet content analysis, the traffic reporting component stores the packet of the target flow into an SKB queue. For the packet in the SKB queue, according to a reporting policy of the target flow to which the packet belongs, data needing to be reported periodically (a packet, or a packet and statistical information) is triggered by a timer to be reported to the traffic sensing control 133, and a packet needing to be reported immediately is reported by a NetLink threshold to the traffic sensing control 133.

It should be noted that there may be one or more target flows, and when detecting packets of the target flow, the traffic reporting component may report all or some of the packets of the target flow to the traffic sensing component, which is not limited in this embodiment of this application.

Detection and reporting of a heartbeat flow packet in the target flow are used as an example to describe a specific implementation procedure of the packet reporting component with reference to FIG. 14.

Figure 15:
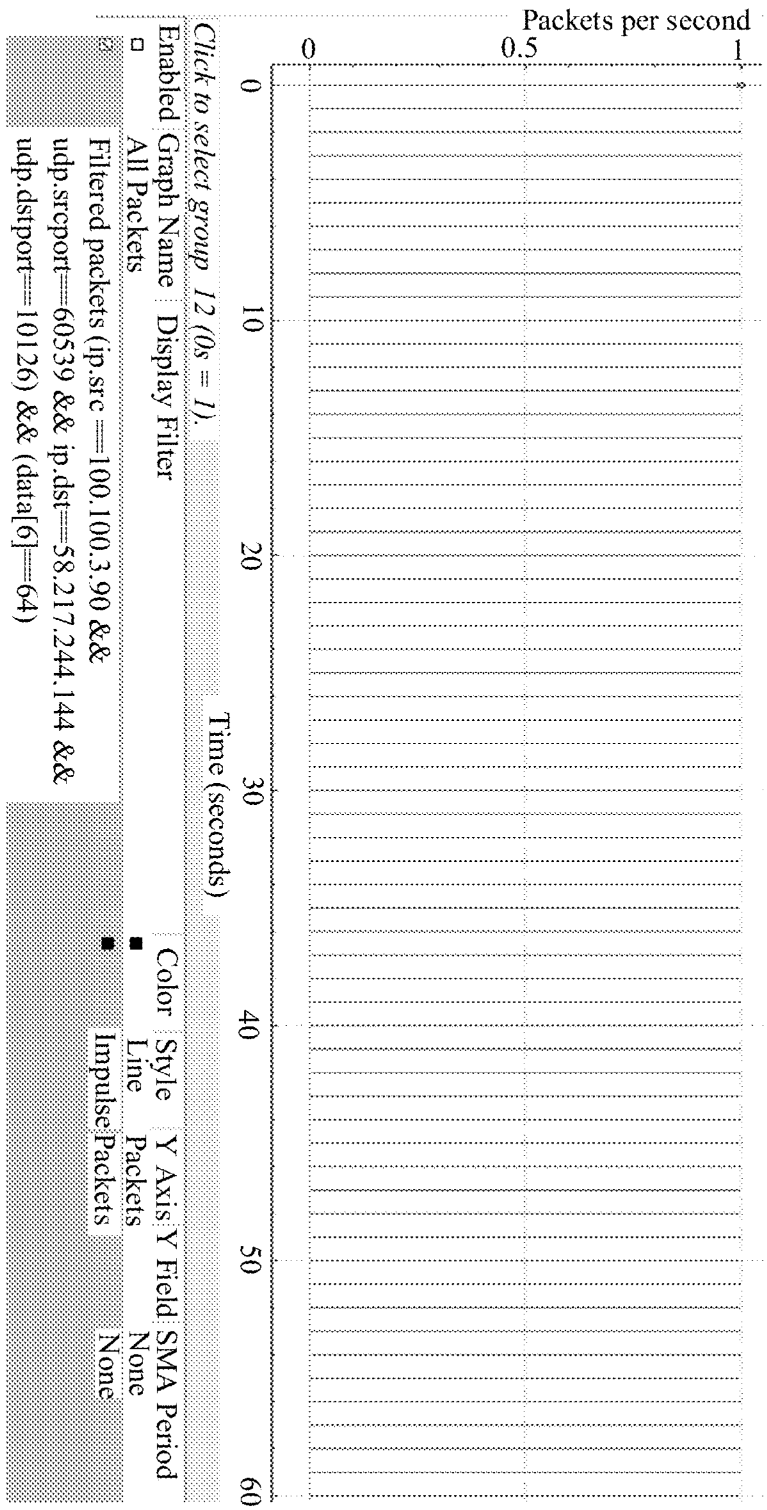
FIG. 15 is a schematic diagram of a heartbeat flow packet with an interval of is according to an embodiment of this application.
Figure 16:
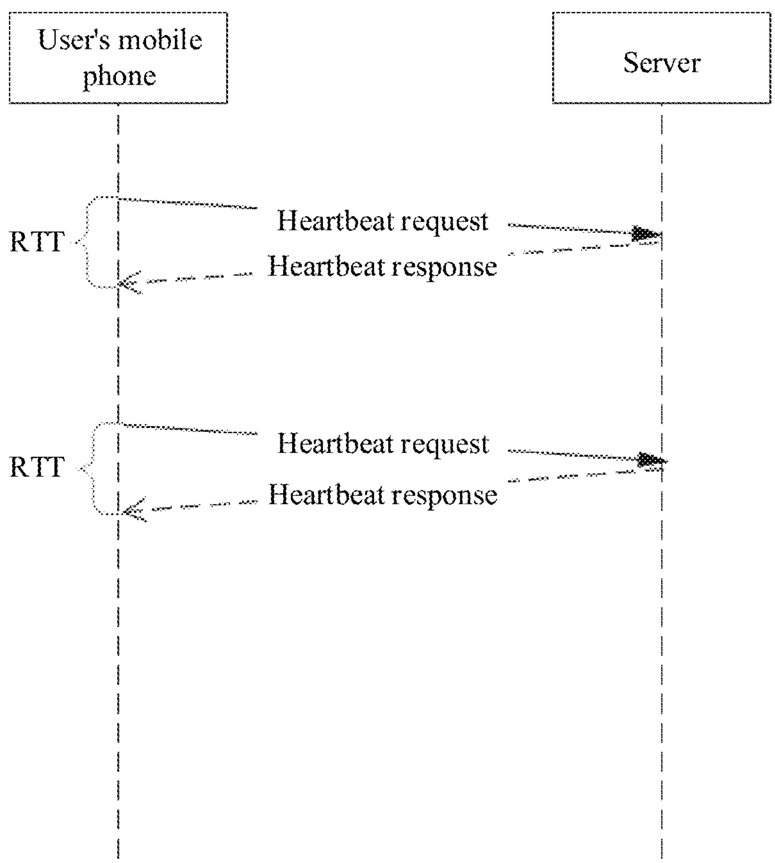
FIG. 16 is a schematic diagram of a method for calculating a round-trip time of a heartbeat flow packet.

The heartbeat flow packet herein may be a message that appears in the target flow at a specific time interval, and preset feature information exists in a fixed position of a payload of the heartbeat flow packet. Optionally, a 5-tuple of the heartbeat flow message and a 5-tuple of another packet in a same flow may be the same or different. The time interval of the heartbeat flow message in this embodiment of this application is not limited in this embodiment of this application, and is, for example, is. FIG. 15 is a schematic diagram of a heartbeat flow packet with an interval of is. Correspondingly, subsequently the traffic sensing component 133 may calculate a round-trip time based on the heartbeat flow packet, and use the round-trip time as a network quality assessment parameter of the target flow to determine network quality of the target flow. For an RTT calculation method of the heartbeat flow packet, reference may be made to, for example, FIG. 16. For specific description, refer to the foregoing related description. Details are not described herein again.

For example, the heartbeat flow packet provided in this embodiment of this application may have the following feature: (ip.src==100.100.3.90 && udp.srcport==60539 && ip.dst==58.217.244.144 && udp.dstport==10126) && (data[6]==64). data[6] represents the $6^{th}$ byte of a payload of the packet.

Refer to FIG. 15. A specific implementation procedure of the packet reporting component includes the following steps.

Step S1: Perform Initialization.

When the network application is starting and loading, the traffic reporting component 141 receives an app launch message to register the nf_hook hook function. Code examples are shown in FIG. 17A and FIG. 17B.

Step S2: Perform Packet Processing.

This step specifically includes three steps: packet parsing, flow table lookup, and packet analysis. A flow table records identification information of a flow in each network application and statistical information of each flow. The statistical information of each flow may include: a quantity of received packets of the flow, a total quantity of bytes of received packets of the flow, a quantity of error packets, and the like. The identification information of the flow may be calculated based on a 5-tuple or a 4-tuple of the packet in the flow, and the calculation may specifically use a hash algorithm, so that the identification information of the flow may be a hash value obtained through calculation based on the 4-tuple or the 5-tuple of the packet.

During packet parsing, the traffic reporting component 141 obtains a packet, and may parse it out to determine whether a UID of the network application exists in the packet. If the UID of the network application exists, it indicates that the packet is a packet of the network application, and parses a 4-tuple (or 5-tuple) of the packet, and a subsequent step of flow table lookup is performed. If the UID of the network application does not exist, it indicates that the packet is not a packet of the network application, and the procedure ends.

The 4-tuple may include: a source IP, a destination IP, a source port, and a destination port, and the 5-tuple may include: a source IP, a destination IP, a source port, a destination port, and a protocol number.

During flow table lookup, the identification information of the flow may be calculated based on the 4-tuple (or 5-tuple) of the packet, and the calculated identification information may be used to find whether the identification information is already recorded in the flow table. If the identification information is already recorded, statistical information corresponding to the identification is updated in the flow table. If the identification information is not recorded, a flow node is created in the flow table based on the identification information of the flow, and statistical information of the flow is updated in the flow node.

During packet analysis, the traffic reporting component 141 may preset a flow model and filter the received packets, so as to obtain all or some of the packets of the target flow. For example, if the foregoing flow model of the heartbeat flow packet is used, a heartbeat flow packet of the target flow may be obtained.

The flow model may be configured for the traffic reporting component through a configuration file, and the configuration file may be carried in the traffic reporting request sent by the traffic sensing component in step 1206. The flow model records a feature that a packet need to match. For example, as shown in FIG. 18, in the heartbeat flow packet, the $6^{th}$ byte of a packet payload may have fixed feature information. For example, feature information in an uplink heartbeat flow packet is 0x64, and feature information in a downlink heartbeat flow packet is 0x65. In this case, a matching feature filterStr may be preset in the flow model, to match 0x64 in an uplink flow and match 0x65 in a downlink flow, and a matching position is 6 bytes offset from a UDP payload.

As shown in FIG. 19, in code logic, memcmp may be used to compare whether packet content is consistent with the configured matching feature filterStr. Specific code is: if (memcmp(rpt_cfg→filter_str[i], payload+filter_str_offset, rpt_cfg→filter_str_len[i])==0). memcmp obtains, through comparison, a packet consistent with the matching feature filterStr, to filter out the packet of the target flow, that is, filter out the target flow.

Step S3: Report a matched target flow and statistical information of the target flow according to a flow reporting policy.

Specifically, the filtered-out packet of the target flow may be stored in the SKB queue, and is reported periodically or immediately according to the reporting policy of the target flow.

In the case of periodic reporting, at the end of each period, some or all of packets of the target flow that are received in the current period (for example, the last packet of the target flow received in the current period) may be reported to the traffic sensing component. Optionally, packet statistics information (such as a quantity of packets and a quantity of bytes) of the target flow in the current period may be further reported to the traffic sensing component.

In the case of immediate reporting, a matched packet may be directly reported to the traffic sensing component.

Through the processing above, the packet of the target flow may be accurately matched and filtered out in the traffic reporting component, and the reported packet may be used for network quality assessment in the traffic sensing component.

Step 1308: The traffic sensing component 133 detects a delay-sensitive flow. If the flow is a delay-sensitive flow, perform step 1309; or if the flow is not a delay-sensitive flow, perform step 1314.

Specifically, feature information of packets of different delay-sensitive flows of different applications may be summarized in advance, including but not limited to: a protocol type (TCP/UDP), a port number, a data packet transmission feature (a size, a quantity, a transmission rate, and the like), a specific string in a packet, and the like. In step 1206, feature information of a delay-sensitive flow of the current application may be delivered to the traffic sensing component 133. Correspondingly, the traffic sensing component may perform, based on feature information of a packet of a delay-sensitive flow of the current application, feature information matching or statistical verification on the packet reported by the traffic reporting component 141, to determine whether a plurality of flows of the current application carried on the currently used cellular channel are delay-sensitive flows or not delay-sensitive flows.

Figure 20:
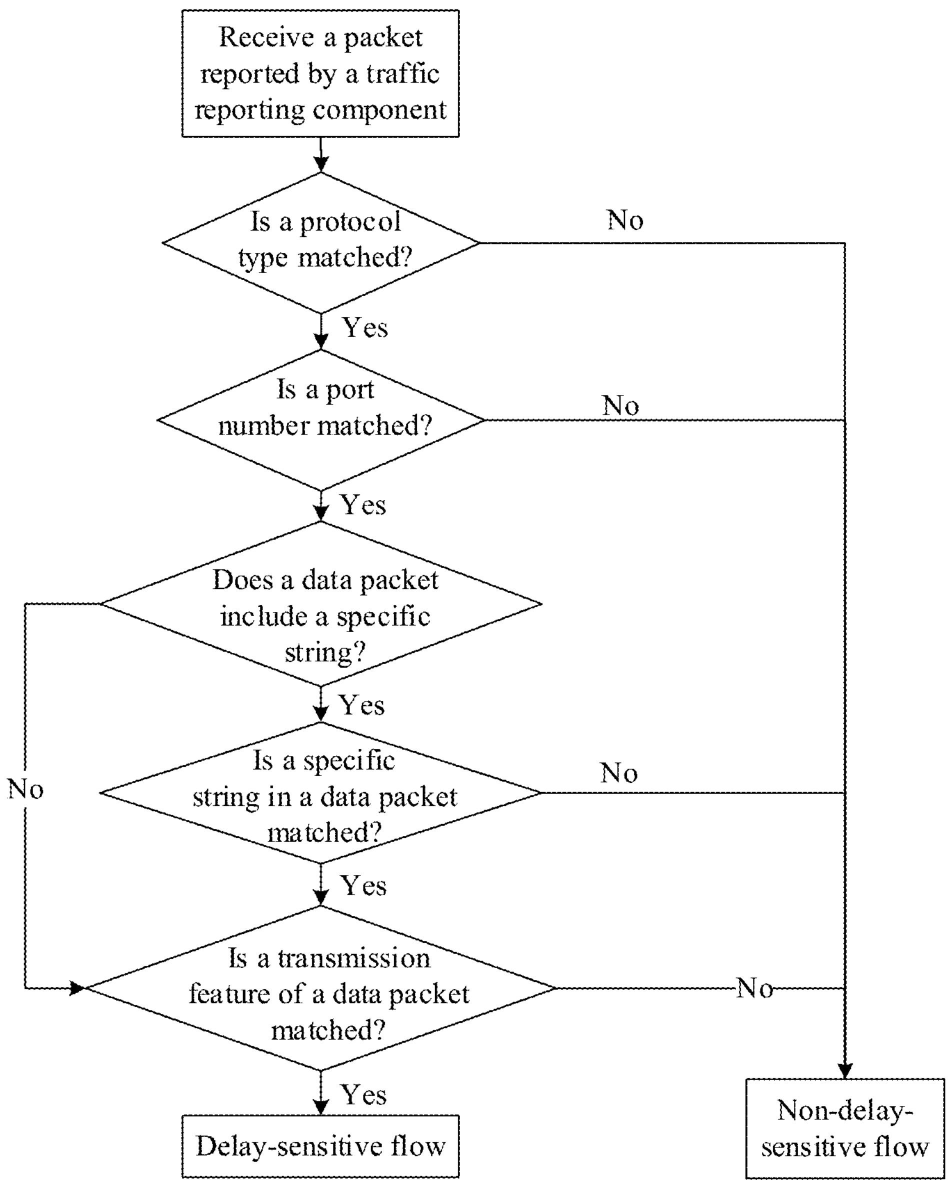
FIG. 20 is a schematic diagram of code implementation of a method for detecting a delay-sensitive flow according to an embodiment of this application.

A packet of a specific delay-sensitive flow includes, for example, the following feature information: a protocol type of the packet, a port number, a specific string included in a data packet, and a data packet transmission feature. In this case, the traffic sensing component 133 may detect the delay-sensitive flow by using, for example, a procedure shown in FIG. 20.

Protocol type matching, port number matching, matching of whether the data packet includes a specific string, matching of a specific string, and data packet transmission feature matching are sequentially performed for the packet. When matching results are all successful, a flow to which the packet belongs is a delay-sensitive flow; otherwise, a flow to which the packet belongs is a non-delay-sensitive flow.

In a possible implementation, the traffic sensing component 133 may detect the delay-sensitive flow based on a UDP protocol number and a specific transmission of the packet. Arena of Valor is used as an example. A packet of a game battle flow in Arena of Valor has a specific udp protocol number and a packet header feature "payload=0x00010000". In this case, the traffic sensing component 133 may perform, based on the UDP protocol number and the packet header feature, feature information matching for the packet reported by the traffic reporting component 141, to determine whether a flow is a game battle flow. A code example is shown in FIG. 21.

In another possible implementation, the traffic sensing component 133 may detect the delay-sensitive flow based on a protocol type and a quantity of packets. Peacekeeper Elite is used as an example. For a game battle flow in Peacekeeper Elite, more than 10 UDP packets are transmitted in each 500-ms period. In this case, the traffic sensing component 133 may count a quantity of UDP packets of each flow received in each period of a plurality of periods. If a quantity of UDP packets of a specific flow is greater than a preset quantity threshold (for example, 10), it is determined that the flow is a game battle flow; otherwise, the flow is not a game battle flow. A code example of a game battle flow in the Peacekeeper Elite game is shown in FIG. 10.

Optionally, the game battle flow is used as an example of the foregoing delay-sensitive flow, and the delay-sensitive flow may also be a video call flow, an audio call flow, or the like. The non-delay-sensitive flow may be, for example, a download flow, a browsing flow, or the like.

Step 1309: The traffic sensing component 133 indicates, to the flow-level path management component 131, that a flow type of a flow A is a delay-sensitive flow.

Step 1310: The flow-level path management component 131 determines whether the currently used cellular channel meets a transmission requirement of the flow A. If the currently used cellular channel meets the transmission requirement of the flow A, the flow A continues to be carried on the cellular channel, and this subprocess ends. If the currently used cellular channel does not meet the transmission requirement of the flow A, perform step 1311.

Specifically, the channel-level path management component 123 has sent the assessment result of the cellular channel to the flow-level path management component 131 through a notification message in step 1305, and the flow-level path management component 131 may determine whether the cellular channel meets the transmission requirement of the flow A based on the assessment result of the cellular channel. In a possible implementation, the flow-level path management component 131 may determine whether a delay of the cellular channel is less than a preset threshold, and if the delay of the cellular channel is less than the preset threshold, it is determined that the cellular channel meets the transmission requirement of the flow A; otherwise, it is determined that the cellular channel does not meet the transmission requirement of the flow A.

If the cellular channel meets the transmission requirement of the flow A, the flow-level path management component decides to continue to carry the flow A on the cellular channel, so as to not only ensure transmission quality of the flow A, but also prevent impact on transmission quality of the flow caused by a channel switching delay of switching of the flow A from the cellular channel to the WiFi channel, thereby preventing stuck service execution, and improving user experience.

Step 1311: The flow-level path management component 131 sends a channel switching indication to the flow-level policy management component 132.

Specifically, the flow-level path management component determines that the currently used cellular channel does not meet a transmission requirement of the flow A, and sends a channel switching indication to the flow-level policy management component 132. The channel switching indication is used to indicate the flow-level policy management component 132 to switch the flow A to the WiFi channel.

Step 1312: The flow-level policy management component 132 sends a channel switching indication to the policy enforcement component 142.

Specifically, the channel switching indication sent by the flow-level policy management component 132 is used to indicate the policy enforcement component 142 to switch the network channel of the flow A to the WiFi channel.

Step 1313: The policy enforcement component 142 performs channel switching.

Specifically, the policy enforcement component 142 switches the network channel of the flow A to the WiFi channel in response to the received channel switching indication.

After the policy enforcement component 142 performs the channel switching, this subprocess ends.

Step 1314: The traffic sensing component 133 indicates, to the flow-level path management component 131, that a flow type of the flow A is a non-delay-sensitive flow.

Step 1315: The flow-level path management component 131 determines whether the WiFi channel meets the transmission requirement of the flow A. If the WiFi channel does not meet the transmission requirement of the flow A, the flow A continues to be carried on the cellular channel, and this subprocess ends. If the WiFi channel meets the transmission requirement of the flow A, perform step 1316.

Step 1316: The flow-level path management component 131 sends a channel switching indication to the flow-level policy management component 132.

Specifically, the flow-level path management component determines that the currently used cellular channel meets the transmission requirement of the flow A, and sends a channel switching indication to the flow-level policy management component 132. The channel switching indication is used to indicate the flow-level policy management component 132 to switch the flow A to the WiFi channel.

Step 1317: The flow-level policy management component 132 sends a channel switching indication to the policy enforcement component 142.

Specifically, the channel switching indication sent by the flow-level policy management component 132 is used to indicate the policy enforcement component 142 to switch the network channel of the flow A to the WiFi channel.

Optionally, the flow-level policy management component 132 may also switch all other non-delay-sensitive flows of the current network application carried on the network channel to the WiFi channel.

Step 1318: The policy enforcement component 142 performs channel switching.

Specifically, the policy enforcement component 142 switches the network channel of the flow A to the WiFi channel in response to the received channel switching indication.

After the policy enforcement component 142 performs the channel switching, this subprocess ends.

It can be understood that the foregoing scenario of using the first device to play a game is merely an example for description, and does not constitute a limitation on this embodiment of this application. In some embodiments, scenarios of using the first device to perform services that have relatively low tolerance to stuck services or are relatively sensitive to delays, such as audio and video calls and live broadcast, may be further included.

In the channel switching method in this embodiment of this application, after a network channel with a higher priority is enabled, a flow that has relatively large impact on service running of the network application is not switched to the newly enabled network channel, so as to reduce network channel switching of the flow, thereby reducing a problem of stuck service running caused by the network channel switching of the flow, and improving user experience.

An embodiment of this application further provides an electronic device. The device includes a storage medium and a central processing unit. The storage medium may be a non-volatile storage medium, and the storage medium stores a computer-executable program. The central processing unit is connected to the non-volatile storage medium, and executes the computer-executable program to implement the method provided in any one of the embodiments of FIG. 7A to FIG. 14 of this application.

An embodiment of this application further provides an electronic device, including: one or more processors; a memory; and one or more computer programs. The one or more computer programs are stored in the memory, and the one or more computer programs include instructions. When the instructions are executed by the device, the device is enabled to perform the method provided in any one of the embodiments of FIG. 7A to FIG. 14.

An embodiment of this application further provides a computer-readable storage medium. The computer-readable storage medium stores a computer program, and when the computer program is run on a computer, the computer is enabled to perform the method according to any one of the embodiments of this application shown in FIG. 7A to FIG. 14.

An embodiment of this application further provides a computer program product. The computer program product includes a computer program, and when the computer program is run on a computer, the computer is enabled to perform the method according to any one of the embodiments of this application shown in FIG. 7A to FIG. 14.

It can be understood that, in order to implement the foregoing functions, the foregoing electronic device and the like include a corresponding hardware structure and/or software module for performing the functions. A person skilled in the art may be easily aware that, in combination with the example units and algorithm steps described in the embodiments disclosed in this specification, the embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In this embodiment of this application, function module division may be performed on the electronic device according to the foregoing method example. For example, each function module may be obtained through division to correspond to each function, or two or more functions may be integrated into one processing module. The foregoing integrated module may be implemented in a form of hardware, or may be implemented in a form of a software function module. It should be noted that the module division in the embodiments of this application is an example, and is merely logical function division and may be other division in actual implementation.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes a plurality of instructions for instructing a computer device (which may be a personal computer, a server, a network device, or the like) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

The invention claimed is:

1. A channel switching method, applied to an electronic device, wherein the electronic device is configured to communicate using a first network channel and a second network channel, a use priority of the second network channel is higher than a use priority of the first network channel, and the method comprises:

starting a first application, wherein the first application comprises a first data flow, and the first data flow is carried on the first network channel;

when it is detected that the second network channel is enabled, detecting whether the first data flow is a delay-sensitive flow based on at least one of the following parameters: a protocol type, a port number, a packet transmission feature, or a preset string in a packet, wherein the packet transmission feature comprises at least one of the following: a packet size, a quantity of packets within a preset duration, or a packet transmission speed, and wherein detecting whether the first data flow is a delay-sensitive flow comprises sequentially performing protocol type matching, port number matching, matching of whether a data packet of the first data flow includes the preset string, and data packet transmission feature matching on the data packet of the first data flow;

when it is detected that the first data flow is a delay-sensitive flow, keeping the first data flow still carried on the first network channel; and detecting that transmission of the first data flow carried on the first network channel ends and no data flow is carried on the first network channel, and disabling the first network channel.

2. The method according to claim 1, further comprising:

when it is detected that the second network channel is enabled and it is detected that the first data flow is not a delay-sensitive flow, switching the first network channel carrying the first data flow to the second network channel.

3. The method according to claim 2, wherein before the switching the first network channel carrying the first data flow to the second network channel, the method further comprises:

determining that a network quality of the enabled second network channel meets a transmission requirement of the first data flow.

4. The method according to claim 1, wherein before the keeping the first data flow still carried on the first network channel, the method further comprises:

determining that network quality of the first network channel meets a transmission requirement of the first data flow.

5. The method according to claim 1, further comprising:

determining that a network quality of the enabled first network channel does not meet a transmission requirement of the first data flow, and switching the first network channel carrying the first data flow to the second network channel.

6. The method according to claim 1, further comprising:

when determining that a network quality of the enabled second network channel does not meet a transmission requirement of the first data flow, keeping the first data flow still carried on the first network channel.

7. The method according to claim 1, further comprising:

obtaining a packet of the first application from a packet carried on the first network channel; and obtaining a packet of the first data flow from the packet of the first application.

8. The method according to claim 1, wherein before it is detected that the second network channel is enabled, the method further comprises:

determining that the first application is an application in a preset whitelist.

9. The method according to claim 1, wherein the first network channel is a cellular channel, and the second network channel is a WiFi channel; or the first network channel is a secondary WiFi channel, and the second network channel is a primary WiFi channel.

10. An electronic device, comprising a memory, wherein the memory stores computer program code, the computer program code comprises instructions, and when the electronic device reads the instructions from the memory, the electronic device is enabled to perform operations comprising:

starting a first application, wherein the first application comprises a first data flow, and the first data flow is carried on a first network channel, and wherein the electronic device is configured to communicate using the first network channel and a second network channel, and a use priority of the second network channel is higher than a use priority of the first network channel;

when it is detected that the second network channel is enabled, detecting whether the first data flow is delay-sensitive flow based on at least one of the following parameters: a protocol type, a port number, a packet transmission feature, or a preset string in a packet, wherein the packet transmission feature comprises at least one of the following: a packet size, a quantity of packets within a preset duration, or a packet transmission speed, and wherein detecting whether the first data flow is a delay-sensitive flow comprises sequentially performing protocol type matching, port number matching, matching of whether a data packet of the first data flow includes the preset string, and data packet transmission feature matching on the data packet of the first data flow;

when it is detected that the first data flow is a delay-sensitive flow, keeping the first data flow still carried on the first network channel; and detecting that transmission of the first data flow carried on the first network channel ends and no data flow is carried on the first network channel, and disabling the first network channel.

11. The electronic device according to claim 10, wherein when the electronic device reads the instructions from the memory, the electronic device is enabled to perform operations further comprising:

when it is detected that the second network channel is enabled and it is detected that the first data flow is not a delay-sensitive flow, switching the first network channel carrying the first data flow to the second network channel.

12. The electronic device according to claim 10, wherein when the electronic device reads the instructions from the memory, the electronic device is enabled to perform operations further comprising:

before keeping the first data flow still carried on the first network channel, determining that a network quality of the first network channel meets a transmission requirement of the first data flow.

13. The electronic device according to claim 10, wherein when the electronic device reads the instructions from the memory, the electronic device is enabled to perform operations further comprising:

when it is determined that a network quality of the enabled first network channel does not meet a transmission requirement of the first data flow, switching the first network channel carrying the first data flow to the second network channel.

14. The electronic device according to claim 10, wherein the first network channel is a cellular channel, and the second network channel is a WiFi channel.

15. A non-transitory computer-readable storage medium, comprising computer instructions, wherein when the computer instructions are run on an electronic device, the electronic device is enabled to perform operations comprising:

starting a first application, wherein the first application comprises a first data flow, and the first data flow is carried on a first network channel, wherein the electronic device is configured to communicate using the first network channel and a second network channel, and a use priority of the second network channel is higher than a use priority of the first network channel;

when it is detected that the second network channel is enabled, detecting whether the first data flow is a delay-sensitive flow based on at least one of the following parameters: a protocol type, a port number, a packet transmission feature, or a preset string in a packet, wherein the packet transmission feature comprises at least one of the following: a packet size, a quantity of packets within a preset duration, or a packet transmission speed, and wherein detecting whether the first data flow is a delay-sensitive flow comprises sequentially performing protocol type matching, port number matching, matching of whether a data packet of the first data flow includes the preset string, and data packet transmission feature matching on the data packet of the first data flow;

when it is detected that the first data flow is a delay-sensitive flow, keeping the first data flow still carried on the first network channel; and detecting that transmission of the first data flow carried on the first network channel ends and no data flow is carried on the first network channel, and disabling the first network channel.

16. The non-transitory computer-readable storage medium according to claim 15, wherein when the computer instructions are run on the electronic device, the electronic device is enabled to perform operations comprising:

when it is detected that the second network channel is enabled and it is detected that the first data flow is not a delay-sensitive flow, switching the first network channel carrying the first data flow to the second network channel.

17. The non-transitory computer-readable storage medium according to claim 15, wherein when the computer instructions are run on the electronic device, the electronic device is enabled to perform operations comprising:

before keeping the first data flow still carried on the first network channel, determining that a network quality of the first network channel meets a transmission requirement of the first data flow.

18. The non-transitory computer-readable storage medium according to claim 15, wherein when the computer instructions are run on the electronic device, the electronic device is enabled to perform operations comprising:

when it is determined that a network quality of the enabled first network channel does not meet a transmission requirement of the first data flow, switching the first network channel carrying the first data flow to the second network channel.

19. The non-transitory computer-readable storage medium according to claim 15, wherein the first network channel is a cellular channel, and the second network channel is a WiFi channel.

20. The non-transitory computer-readable storage medium according to claim 15, wherein the first network channel is a secondary WiFi channel, and the second network channel is a primary WiFi channel.

* * * * *